United States Patent
Kawai

(10) Patent No.: US 8,958,010 B2
(45) Date of Patent: Feb. 17, 2015

(54) HOLDING MECHANISM FOR HOLDING MOVABLE BODY, AND IMAGING DEVICE COMPRISING THIS HOLDING MECHANISM

(71) Applicant: Olympus Imaging Corporation, Tokyo (JP)

(72) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 59 days.

(21) Appl. No.: 13/935,774

(22) Filed: Jul. 5, 2013

(65) Prior Publication Data

US 2014/0028862 A1   Jan. 30, 2014

(30) Foreign Application Priority Data

Jul. 27, 2012   (JP) ................................ 2012-166920

(51) Int. Cl.
| | |
|---|---|
| H04N 5/225 | (2006.01) |
| H04N 5/232 | (2006.01) |
| H04N 5/217 | (2011.01) |
| H04N 5/228 | (2006.01) |

(52) U.S. Cl.
CPC ......... *H04N 5/23287* (2013.01); *H04N 5/2171* (2013.01); *H04N 5/2253* (2013.01); *H04N 5/2254* (2013.01); *H04N 5/23212* (2013.01); *H04N 5/23258* (2013.01)
USPC ................... 348/373; 348/208.11; 348/231.4; 348/335; 348/294

(58) Field of Classification Search
USPC ......... 348/208.11, 231.4, 294, 335, 372, 373, 348/374, 423.2, E5.027, E5.078
See application file for complete search history.

(56) References Cited

U.S. PATENT DOCUMENTS

| | | | |
|---|---|---|---|
| 8,164,639 B2* | 4/2012 | Kawai et al. | 348/208.7 |
| 2007/0182824 A1* | 8/2007 | Nomura et al. | 348/208.99 |
| 2008/0055420 A1* | 3/2008 | Orihashi et al. | 348/208.4 |
| 2008/0151065 A1* | 6/2008 | Okumura et al. | 348/208.4 |
| 2009/0002502 A1* | 1/2009 | Shirono | 348/208.99 |
| 2009/0263116 A1* | 10/2009 | Saito | 396/55 |
| 2011/0205420 A1* | 8/2011 | Nakamura | 348/335 |
| 2012/0154665 A1* | 6/2012 | Kaga et al. | 348/335 |

FOREIGN PATENT DOCUMENTS

| | | |
|---|---|---|
| JP | 2008-129326 | 6/2008 |
| JP | 2010-282028 | 12/2010 |

\* cited by examiner

*Primary Examiner* — Hung Lam

(74) *Attorney, Agent, or Firm* — Holtz, Holtz, Goodman & Chick PC

(57) ABSTRACT

A fixing mechanism 110 fixes a holder 166, which holds an imaging unit 116 movable by a VCM, to a neutral position. A press plate 188 fixed at one end to a frame 167 has first and second protrusions 183 and 184 protruding toward the holder. The holder has first and second depressions 185 and 186 which can engage with the protrusions. The first protrusion and the first depression serve to position the holder with reference to the frame and allow the holder to rotate, with the engagement position as a center. The second protrusion and the second depression prevent the holder from rotating and keep the holder at the neutral position.

17 Claims, 14 Drawing Sheets

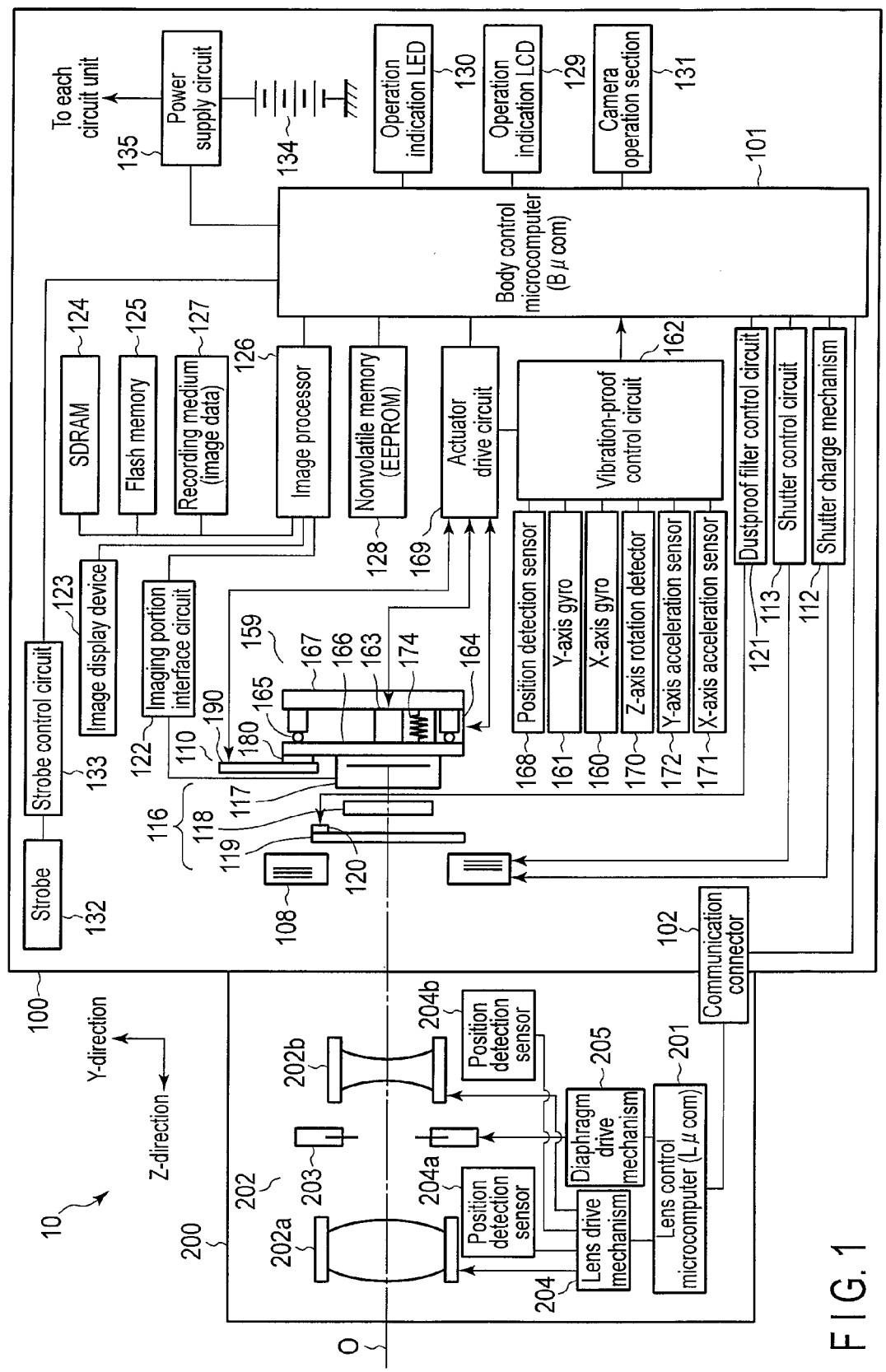
F I G. 1

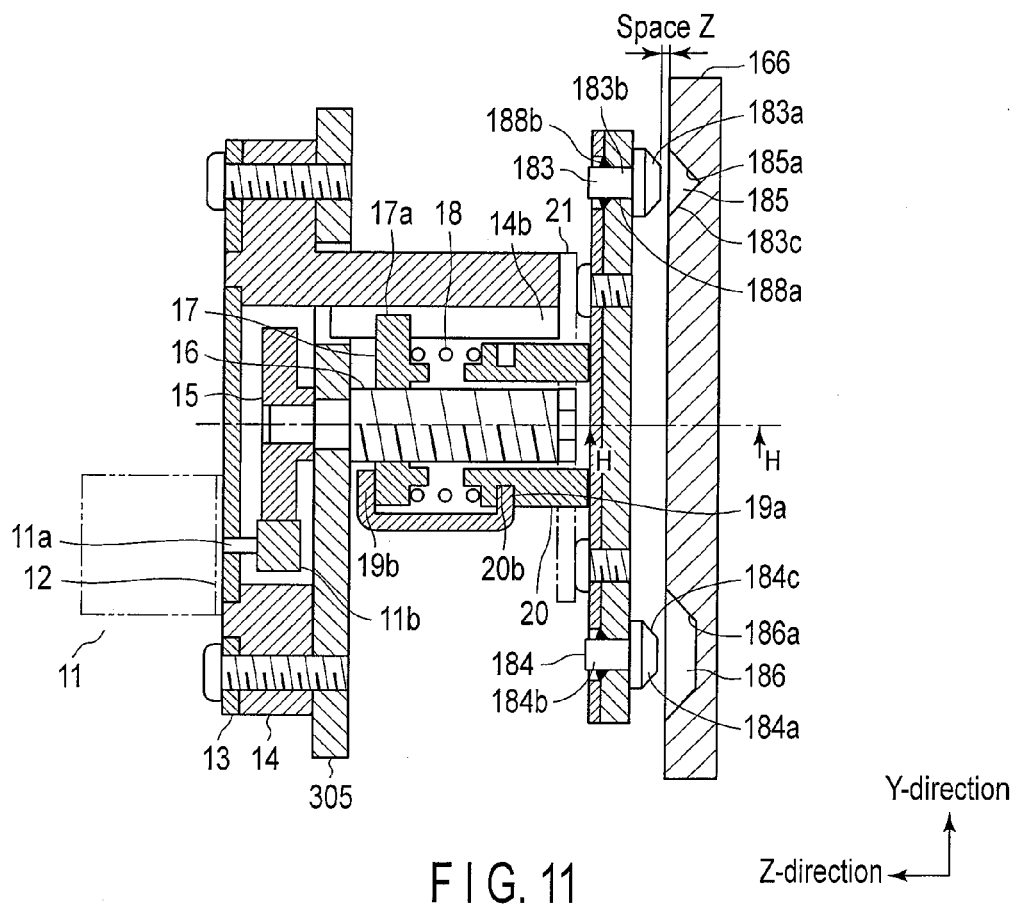
F I G. 11
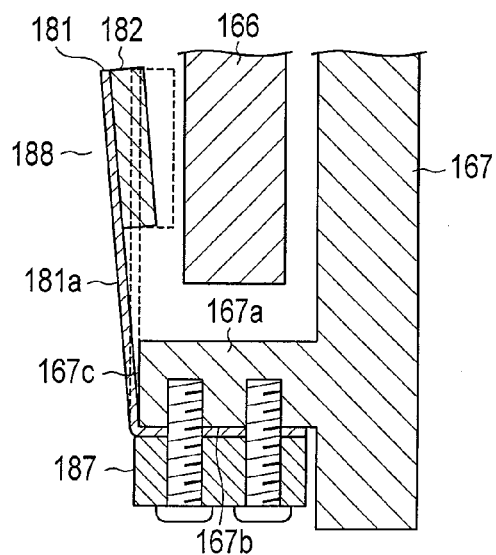
F I G. 12

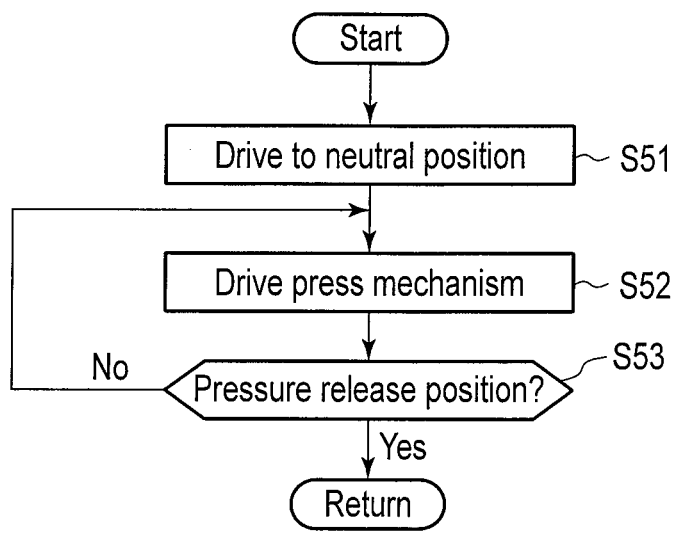
F I G. 15

HOLDING MECHANISM FOR HOLDING MOVABLE BODY, AND IMAGING DEVICE COMPRISING THIS HOLDING MECHANISM

CROSS-REFERENCE TO RELATED APPLICATIONS

This application is based upon and claims the benefit of priority from prior Japanese Patent Application No. 2012-166920, filed Jul. 27, 2012, the entire contents of which are incorporated herein by reference.

BACKGROUND OF THE INVENTION

1. Field of the Invention

Embodiments described herein relate generally to a holding mechanism and an imaging device comprising this holding mechanism. The holding mechanism positions and fixes a movable body at a predetermined position in equipment which moves the movable body in a plane direction by the use of an electromagnetic motor.

2. Description of the Related Art

An electrically driven stage capable of moving in X-axis and Y-axis directions and rotating around a Z-axis (i.e. moving in an XY plane) has heretofore been in use in various places, wherein the X-axis, Y-axis, and Z-axis are three axes of a rectangular coordinate system.

A known concrete example is a shake correction mechanism in a camera. The shake correction mechanism uses shake detection means such as an angular velocity sensor and an acceleration sensor to detect shake vibrations in a pitch direction (rotational direction around the X-axis extending to right and left) of the camera, shake vibrations in a yaw direction (rotational direction around the Y-axis extending up and down) of the camera, shake vibrations in the X-direction (right-and-left direction), shake vibrations in the Y-direction (up-and-down direction), and rotational shake vibrations around the Z-axis (back-and-forth direction). In accordance with detected shake signals, the shake correction mechanism displaces a part of an imaging optical system or an image pickup device (hereinafter referred to as a drive target) in a shake-counteracting direction along a plane that intersects at right angles with an imaging optical axis, and thereby corrects the shake of a figure on an imaging surface of the image pickup device.

This shake correction mechanism has drive means for horizontally and vertically moving the drive target along a plane that intersects at right angles with the imaging optical axis to correct a hand shake. When operating to follow the hand shake, the drive means needs to accurately drive (finely drive) the drive target. The drive means also needs to correctly position the drive target relative to the optical axis of the camera. High drive force is required for the drive means to overcome the gravity of the drive target and obtain acceleration necessary for control.

In the meantime, when no shake correction is made, the drive target needs to be fixed at a home position. In this case, it is preferable to have self-holding performance so that the position of the drive target is held even when the power is off. It is appreciated that such a fixing mechanism is required to be an uncomplicated, small, and low-cost mechanism.

For example, a device disclosed in Jpn. Pat. Appln. KOKAI Publication No. 2008-129326 uses frictional force to hold, between two yoke plates, a substrate holding an image pickup device, and drives the substrate by a voice coil motor to correct a hand shake.

Jpn. Pat. Appln. KOKAI Publication No. 2010-282028 has disclosed a lens unit which uses a piezoelectric element to fix and unfix, relative to a stator, a movable element holding a lens.

When a method that uses frictional force between members to hold a movable body is used, high energy is needed to overcome the frictional force in order to move the movable body, and the output of a driver deteriorates. This problem becomes more serious particularly when the frictional force is increased to increase the holding force of the movable body, and it becomes difficult to accurately position the movable body at a desired position.

When the method that uses the piezoelectric element to fix and unfix the movable body is used, the application of electricity to the piezoelectric element needs to be continued, for example, to keep the movable body unfixed, which leads to increased electric power consumption.

An object of the present invention is to solve the problems associated with the above-mentioned conventional techniques, and provide a holding mechanism having a simple and low-cost configuration that can mechanically position and hold a movable body, and an imaging device comprising this holding mechanism.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram mainly showing an electric system configuration of a camera system according to an embodiment of the present invention;

FIG. 11 is a longitudinal sectional side view (FF sectional view) of the essential parts in which the press mechanism in FIG. 9 is in a non-pressure state;

FIG. 12 is a cross sectional bottom view (HH sectional view) of the essential parts of the press mechanism in FIG. 11 and the positioning mechanism;

FIG. 15 is a flowchart illustrating a neutral holding release operation in FIG. 13;

DETAILED DESCRIPTION OF THE INVENTION

Figure 2:
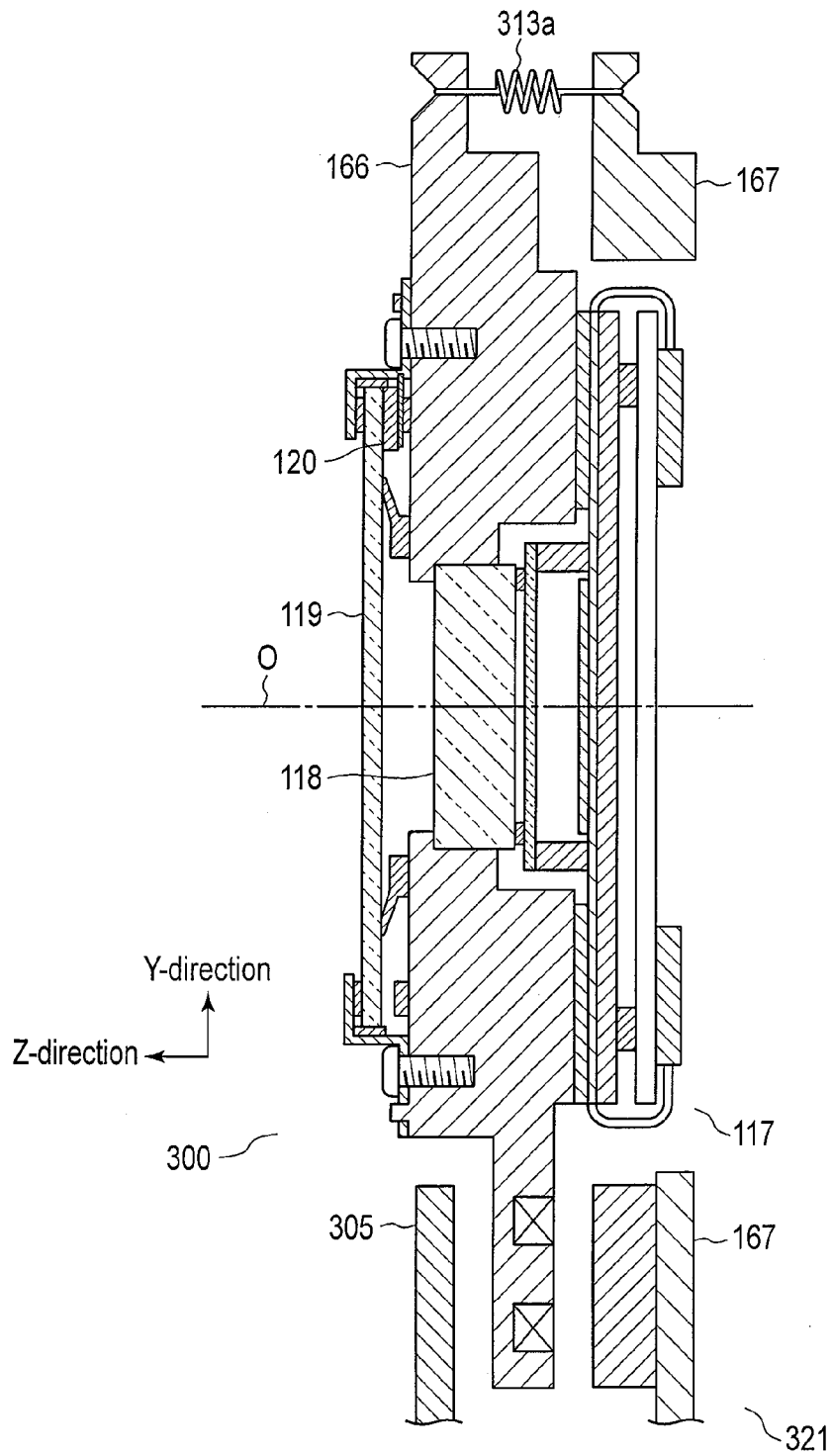
FIG. 2 is a longitudinal sectional side view (CC sectional view) of essential parts of an imaging portion moving mechanism in FIG. 3.

Hereinafter, an embodiment of the present invention will be described with reference to the drawings. An imaging device according to the embodiment has a hand shake correction function to correct a hand shake by moving, in a plane that intersects at right angles with an optical axis (hereinafter, this plane is referred to as a movement plane), an imaging portion including an image pickup device which obtains an image signal by photoelectric conversion. In the case described here, the present invention is applied to a lens-exchangeable single lens electronic camera (digital camera) as an example of the imaging device. It is to be noted that the present invention is not limited to the embodiment described below, and various modifications can be made within the spirit of the invention.

As shown in FIG. 1, a camera system 10 according to the embodiment has a lens unit 200 and a body unit 100. The lens unit 200 is a photography lens for the image formation of an optical figure of a subject. The body unit 100 has an imaging portion 117 comprising an image pickup device such as a charge coupled device (CCD) or a CMOS sensor.

Hereinafter, a direction from the body unit 100 toward the subject is referred to as a forward direction, and the opposite direction is referred to as a rearward direction. This case is based on the assumption that the camera system 10 is disposed in a posture to laterally image the subject from a horizontal direction. Moreover, in this case, an axis corresponding to an optical axis O of an optical system configured by the lens unit 200 is a Z-axis (axis in a back-and-forth direction), and two axes that intersect at right angles with each other on a plane that intersects at right angles with the Z-axis are an X-axis (horizontal axis) and a Y-axis (vertical axis).

First, a detailed configuration of the camera system 10 is described.

As shown in FIG. 1, the lens unit 200 has a photography lens 202 for the image formation of an optical figure of a subject. The imaging portion 117 referred to as an image pickup device such as a charge coupled device (CCD) or a CMOS sensor is disposed at an image formation position of the photography lens 202. The imaging portion 117 is disposed in the body unit 100. The lens unit 200 is removably attached to the body unit 100.

The operation of the lens unit 200 is controlled by a lens control microcomputer (hereinafter referred to as an "Lµcom") 201 provided in the lens unit 200. The operation of the body unit 100 is controlled by a body control microcomputer (hereinafter referred to as a "Bµcom") 101 provided in the body unit 100. The Bµcom 101 functions as neutral holding detection means and judgment means.

When the lens unit 200 is attached to the body unit 100 as shown, the Bµcom 101 and the Lµcom 201 are electrically connected to allow communication with each other via a communication connector 102. The Lµcom 201 operates in accordance with the Bµcom 101. Electric power necessary for the body unit 100 is supplied to the Bµcom 101 from a power supply circuit 135 disposed in the body unit 100. Electric power necessary for the lens unit 200 is supplied to the Lµcom 201 from the power supply circuit 135 via the communication connector 102.

The lens unit 200 is removable from the body unit 100 via an unshown body mount provided on the front side (subject side) of the body unit 100 and via an unshown lens mount provided on the rear side (image sensor side) of the lens unit 200. This removable mechanism is what is known as a bayonet type. This configuration permits the camera system 10 to exchange and be equipped with various lens units 200.

The photography lens 202 is a zoom lens which can change the focal distance by displacing a variable power lens 202b in an optical axis direction. The variable power lens 202b is displaced along the optical axis by an unshown actuator such as a stepping motor provided in a lens drive mechanism 204.

A diaphragm 203 is provided in the lens unit 200. The diaphragm 203 is driven by an unshown actuator such as a stepping motor provided in a diaphragm drive mechanism 205. Information regarding the lens unit 200 such as the in-focus distance, focal distance, and aperture value of the photography lens 202 is detected by position detection sensors 204a and 204b and an unshown encoder, and is input to the Bµcom 101 via the Lµcom 201 and the communication connector 102.

The imaging portion 117 provided in the body unit 100 is held in the body unit 100 via a later-described imaging portion moving mechanism 159 which moves the imaging portion. The imaging portion 117 comprises a photoelectric conversion element such as a CCD or a CMOS. An optical filter 118 such as an optical low pass filter or an infrared cut filter and a dustproof filter 119 are provided on the front side of the imaging portion 117. The imaging portion 117, the optical filter 118, and the dustproof filter 119 constitute an imaging unit 116.

A piezoelectric element 120 is attached to the peripheral edge of the dustproof filter 119. In accordance with a dustproof filter control circuit 121, the piezoelectric element 120 vibrates the dustproof filter 119 at a frequency determined by its dimensions and material. Dust sticking to the dustproof filter 119 can be removed by the vibrations of the piezoelectric element 120.

A shutter 108 generally called a focal plane shutter is provided on the front side of the dustproof filter 119. A shutter charge mechanism 112 and a shutter control circuit 113 are provided in the body unit 100. The shutter charge mechanism 112 charges springs which drive a front curtain and a rear curtain of the shutter 108. The shutter control circuit 113 controls the movements of the front curtain and the rear curtain. The optical filter 118, the dustproof filter 119, and the shutter 108 are properly provided when needed. The camera system 10 may be configured without these components.

The imaging portion 117 is electrically connected to an image processor 126 via an imaging portion interface circuit 122 which controls the operation of the imaging portion 117. The image processor 126 uses a storage area such as an SDRAM 124 and a flash memory 125 to generate an image in accordance with an image signal which is output from the imaging portion 117 and then processed in the imaging portion interface circuit 122.

On the other hand, the image processor 126 also performs control associated with automatic exposure and automatic focus. The automatic exposure is designed to detect the brightness value of a predetermined region of an image generated by the image processor 126, and control the size of the aperture of the diaphragm 203 to obtain a proper exposure amount and also control the shutter speed of the shutter 108. The automatic focus is based on what is known as a contrast detection type. A focus lens 202a is vibrated (wobbled) in the optical axis direction at predetermined amplitude to generate a plurality of images at different positions on the optical axis. Contrast values of these images in predetermined regions (focus areas) are calculated to detect whether a focal position is located on a far side or a near side. The focus lens 202a is then moved toward focus while being wobbled, and images are loaded (photography is performed). As a result, a maximum contrast (focal position) can be detected from the images, and the focus lens 202a is stopped at this position, such that the automatic focus is performed. Both an automatic exposure control circuit and an automatic focus control circuit do not need to be provided in the image processor 126, and can be provided in another circuit such as the Bµcom 101.

The image processor 126 is connected to an image display device 123 such as a liquid crystal display device or an organic electroluminescent display device (organic EL display device) provided in the rear of the body unit 100, and can display images via the image display device 123. The image display device 123 also functions as what is known as an electronic viewfinder for real-time display of images obtained by the camera system 10. The camera system 10 according to the present embodiment has a configuration without any optical finder, but may be provided with a single-lens-reflex-type optical finder.

A recording medium 127 is, for example, a flash memory or an HDD, and is removably provided in the body unit 100. Data such as images (including sound in the case of moving images) obtained by the camera system 10 are recorded in the recording medium 127. The obtained image data has a great information amount in this state, and is therefore recorded in the recording medium 127 after compressed to reduce the information amount. The image data is compressed in the image processor 126. The image processor 126 also performs image uncompressing processing to uncompress the compressed data recorded in the recording medium 127 into original image data to be displayed on the image display device 123.

A nonvolatile memory 128 is a storage comprising, for example, an EEPROM for storing predetermined control parameters necessary for the control of the camera system 10. The nonvolatile memory 128 is provided to allow access from the Bµcom 101.

An operation indication LCD 129, an operation indication LED 130, a camera operation section 131, a strobe control circuit 133 are connected to the Bµcom 101. The operation indication LCD 129 and the operation indication LED 130 indicate and let a user know the operation status of the camera system 10. The strobe control circuit 133 drives an internal strobe 132 and an unshown external strobe. The camera operation section 131 is a switch group including operation buttons necessary to operate the camera system 10, for example, a release SW, a mode change SW, and a power SW.

A battery 134 as a power supply and a power supply circuit 135 are further provided in the body unit 100. The power supply circuit 135 supplies a voltage of the battery 134 after converting the voltage to a voltage necessary for each of the circuit units constituting the camera system 10. A voltage detection circuit (not shown) is also provided in the body unit 100 to detect a voltage change made when a current is supplied from an external power supply via an unshown jack.

The camera system 10 according to the present embodiment comprises the imaging portion moving mechanism 159 to move the imaging portion 117 in the X-axis direction, in the Y-axis direction, and in the rotational direction around the Z-axis for the correction of a hand shake, and to fix the imaging portion 117 at a predetermined position. That is, the imaging portion 117 is held via the imaging portion moving mechanism 159 so that the imaging portion 117 can be mechanically moved along an XY plane and can also be mechanically fixed at the predetermined position. The hand shake correction referred to here does not only mean the correction of a shake that occurs when the camera is held by hand, but also the correction of a shake that occurs when the camera is attached to a tripod or a robot arm.

The imaging portion moving mechanism 159 comprises an X-axis gyro 160, a Y-axis gyro 161, a Z-axis rotation detector 170, a vibration-proof control circuit 162, an X-axis actuator 163 (drive mechanism), a Y-axis actuator 164 (drive mechanism), a holder 166 (movable body) holding the imaging portion 117, a fixed frame 167 (fixed member), a fixing mechanism 110 which positions and fixes the holder 166 at a predetermined position, a position detection sensor 168, and an actuator drive circuit 169 (drive mechanism control means). The fixing mechanism 110 has a positioning mechanism 180 (pressed means) and a press mechanism 190.

The imaging portion moving mechanism 159 including a driver 300 that uses an electromagnetic voice coil motor (VCM) as an actuator is described below in detail with reference to FIG. 2 to FIG. 12.

Figure 3:
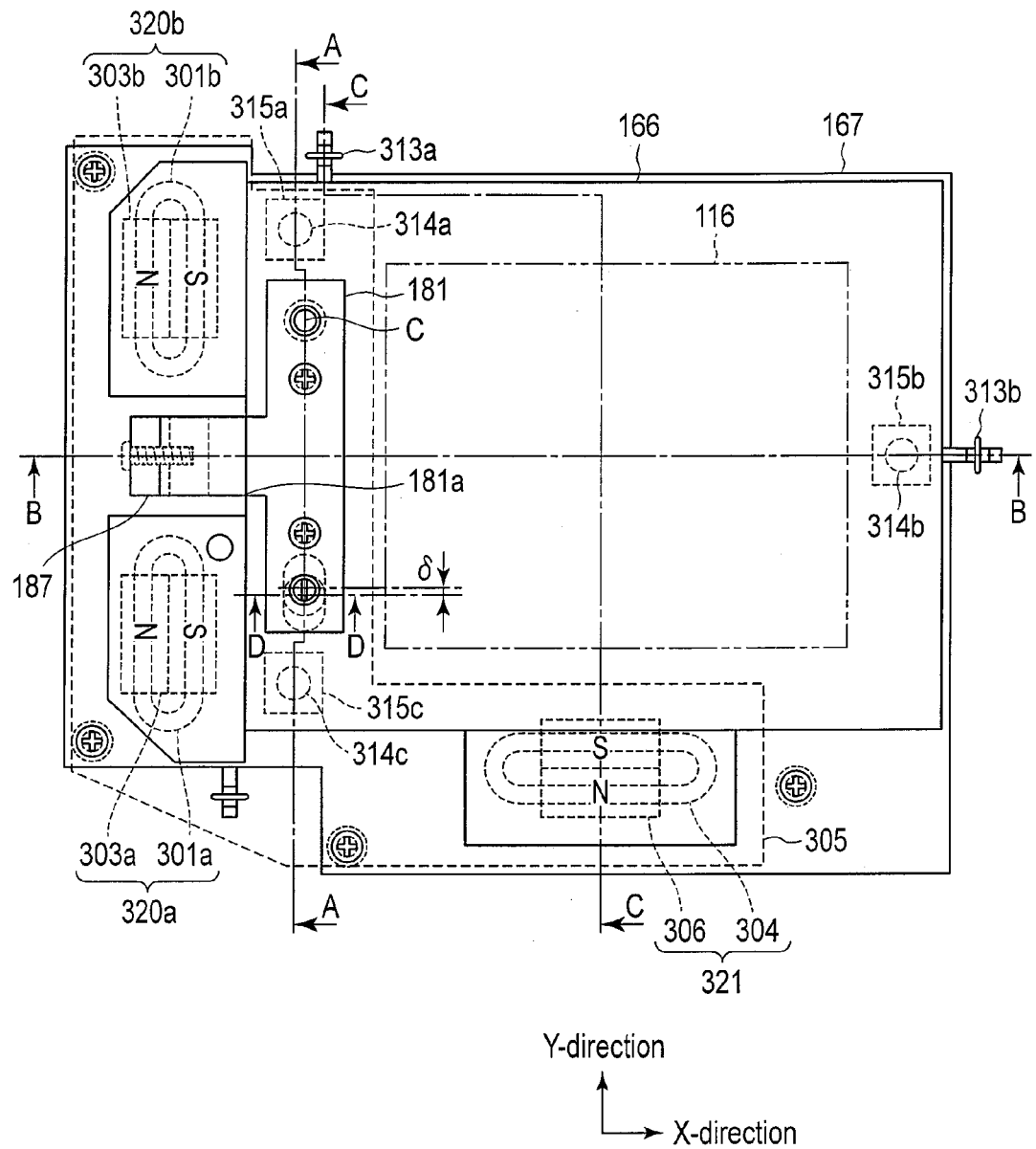
FIG. 3 is a schematic simplified front view showing the essential parts of the imaging portion moving mechanism incorporated in the camera system in FIG. 1.
Figure 4:
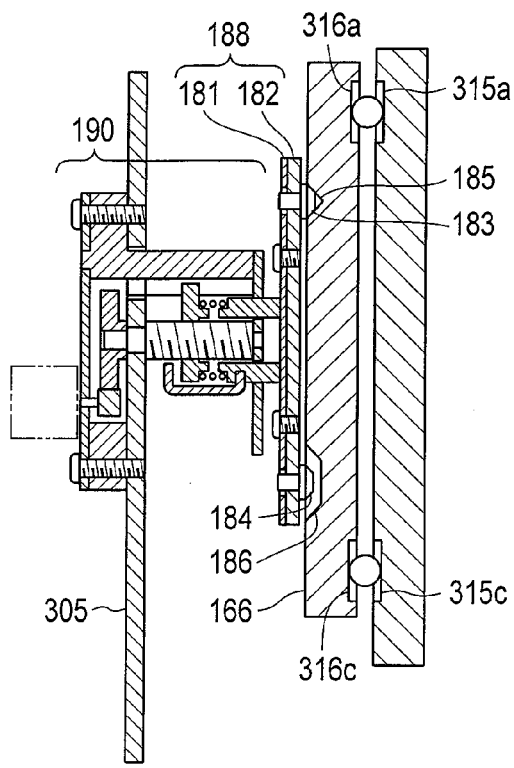
FIG. 4 is a longitudinal sectional side view (AA sectional view) of the essential parts of the imaging portion moving mechanism in FIG. 3.
Figure 5:
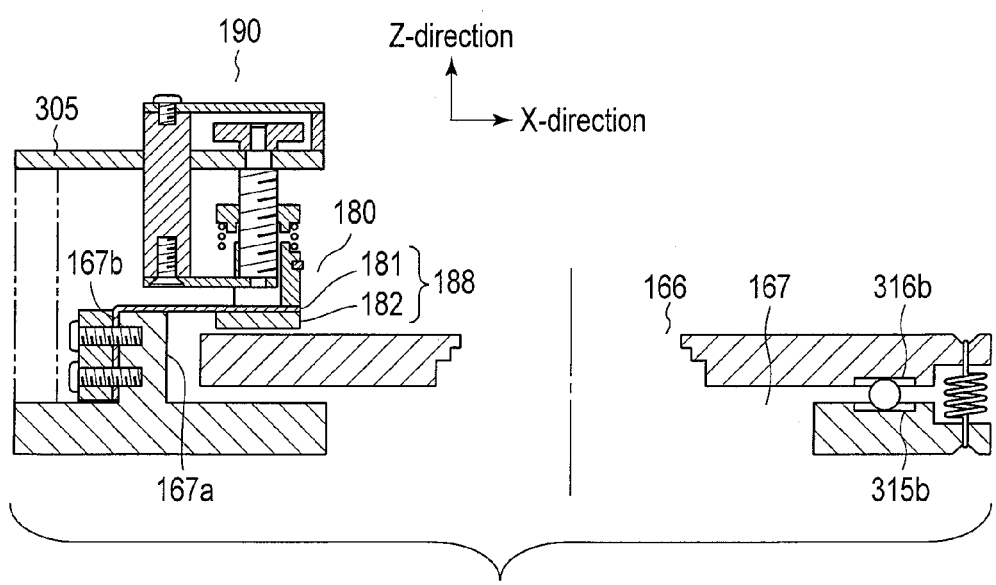
FIG. 5 is a cross sectional bottom view (BB sectional view) of the essential parts of the imaging portion moving mechanism in FIG. 3.
Figure 6:
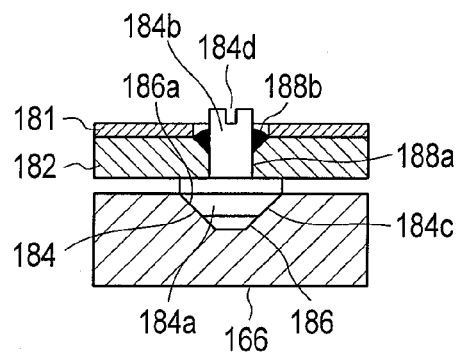
FIG. 6 is a cross sectional bottom view (DD sectional view) of a positioning mechanism in FIG. 3.
Figures 7A, 7B:
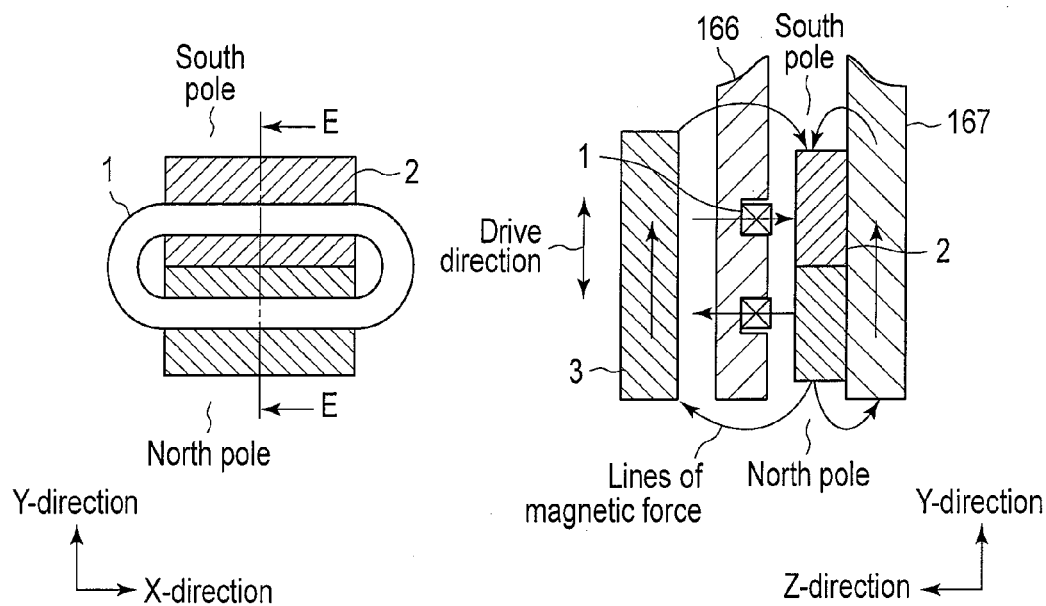
FIG. 7A is a partial front view showing the structure of essential parts of a voice coil motor (VCM) in FIG. 3.
FIG. 7B is a partial longitudinal sectional side view (EE sectional view) of the VCM in FIG. 7A.

FIG. 3 is a schematic front view showing the structure of the essential parts of the imaging portion moving mechanism 159. FIG. 2 is a sectional side view showing, from the side, a section of the structure in FIG. 3 taken along the line CC. FIG. 4 is a sectional side view showing, from the side, a section of the structure in FIG. 3 taken along the line AA. FIG. 5 is a sectional bottom view showing, from the bottom, a section of the structure in FIG. 3 taken along the line BB. FIG. 6 is a sectional bottom view showing, from the bottom, a section of the structure in FIG. 3 taken along the line DD. FIG. 7A is a schematic front view showing the configuration of the VCM. FIG. 7B is a sectional side view showing, from the side, a section of the VCM in FIG. 7A taken along the line EE.

The frame 167 is fixed to the body unit 100. The holder 166 holding the imaging portion 117 is supported by the frame 167 movably in the X-axis direction, in the Y-axis direction, and in the rotational direction around the Z-axis. That is, the holder 166 is supported by the frame 167 when three balls 314'(314a, 314b, and 314c) respectively placed in contact with slide surfaces 315 (315a, 315b, and 315c) of three depressions disposed in the frame 167 are received slide surfaces 316 (316a, 316b, and 316c) of depressions disposed in the holder 166.

In other words, the three rectangular depressions 315a, 315b, and 315c indicated by broken lines in FIG. 3 are formed in the front surface of the frame 167, that is, the surface facing the holder 166. The three depressions 315a, 315b, and 315c are dispersedly located apart from one another around the imaging unit 116. The three rectangular depressions 316a, 316b, and 316c facing the three depressions 315a, 315b, and 315c are also formed in the surface of the holder 166 facing the frame 167. The balls 314a, 314b, and 314c are respectively disposed between the depressions 315a, 315b, and 315c of the frame 167 and the depressions 316a, 316b, and 316c of the holder 166. The depressions have the same shape, and the balls are spheres having the same diameter. Therefore, when the holder 166 faces the frame 167 across the balls 314, the surfaces in which the frame 167 and the holder 166 face each other are disposed parallel.

Presser bar springs 313 (313a, 313b, and 313c) which are helical extension springs are attached to three protrusions respectively provided to face the outer peripheral portions of the holder 166 and the frame 167. The protrusions are respectively located as close to the depressions as possible. As a result, the three balls 314a, 314b, and 314c between the holder 166 and the frame 167 are pressed, and thus held by pairs of depressions to which the balls 314a, 314b, and 314c correspond.

The configuration described above permits the holder 166 to freely move along a plane (reference plane) including three points where the three balls 314a, 314b, and 314c come into contact with the slide surfaces in the bottoms of the depressions 316a, 316b, and 316c of the holder 166. That is, frictional force in a direction along the XY plane from the frame 167 hardly acts on the holder 166. At the same time, the position of the holder 166 in the Z-axis direction is a planar position including three points where the three balls 314a, 314b, and 314c come into contact with the slide surfaces in the depressions of the holder 166. This plane is parallel to the XY plane. In other words, the holder 166 is movable along the XY plane, while the movement of the holder 166 in the Z-axis direction is regulated. Thus, when the VCM described below is not in operation, the holder 166 freely moves relative to the frame 167 in the XY plane direction in response to the application of external force such as gravity in the XY plane direction.

As described above, the holder 166 is movable relative to the frame 167 along the XY plane, so that the three depressions 316a, 316b, and 316c of the holder 166 and the three depressions 315a, 315b, and 315c of the frame 167 shift in the XY plane direction. However, according to the present embodiment, the holder 166 holding the imaging portion moves along the XY plane by the millimeters. Therefore, the size of each depression is sufficiently large for the movement distance of the holder 166, and there is no fear that the balls 314a, 314b, and 314c may drop from the depressions in response to the movement of the holder 166.

FIG. 7A shows a front view of the VCM functioning as the X-axis actuator 163 and the Y-axis actuator 164 which drive the holder 166 in the XY plane direction. FIG. 7B shows an EE sectional side view of the VCM in FIG. 7A.

The VCM includes a coil 1 fixedly provided in the holder 166, a magnet 2 fixedly provided in the frame 167 to face the coil 1, and a yoke 3 located to hold the coil 1 between the magnet 2 and the yoke 3. The coil 1 has a structure in which a conductive thin wire having an insulating coating is wound into a track shape. The coil 1 is fixed to the holder 166, for example, by adhesive bonding. The plate-shaped magnet 2 is magnetized in the Y-direction so that the lower side is a north pole and the upper side is a south pole in FIG. 7. The magnet 2 is fixed, for example, by adhesive bonding. The plate-shaped yoke 3 made of a magnetic material is disposed on the front side of the coil 1 in the Z-direction at a position facing the magnet 2. The frame 167 is made of a magnetic material such as iron so that a magnetic circuit is formed to prevent the leakage of lines of magnetic force when a current is passed through the magnet 2 or the coil 1.

When a current is passed through the coil 1 of the VCM, electromagnetic force acts on the part of the coil 1 where the direction of the current intersects at right angles with the lines of magnetic force of the magnet 2. As a result, the holder 166 is driven. If the direction of the current passed through the coil 1 is reversed, the holder 166 is driven in the reverse direction. The force acting on the holder 166 can be changed by the intensity of the current running through the coil 1.

According to the present embodiment, the VCMs are laid out at three places shown in FIG. 3. Specifically, three VCMs, that is, a VCM-XA 320a, a VCM-XB 320b, and a VCM-Y 321 are disposed between the frame 167 and the holder 166. The VCM-XA 320a and the VCM-XB 320b are the X-axis actuator 163 which generates drive force in the X-axis direction. The VCM-Y 321 is the Y-axis actuator 164 which generates drive force in the Y-axis direction. In the case of driving in the rotational direction around the Z-axis, different drive forces (opposite drive forces in some cases) are applied to the VCM-XA 320a and the VCM-XB 320b.

The position of the holder 166 along the XY plane is controlled by the position detection sensor 168 which detects the X-axis direction, the Y-axis direction, and the rotational direction around the Z-axis of the holder 166, and by the actuator drive circuit 169 which controls the operations of the VCM-XA 320a, the VCM-XB 320b, and the VCM-Y 321. More specifically, the position detection sensor 168 includes a hall element provided in the holder 166, and a plurality of magnets provided in the frame 167 to face the hall element. The position detection sensor 168 has a position detection accuracy of about 1 μm, and can accurately detect the position of the holder 166.

Meanwhile, the VCM has such a property as to continue to move a moving target (the holder 166 in the present embodiment) in a constant direction in accordance with the direction of a current passed through the coil 1. Therefore, when electricity is applied to the VCM to stop the holder 166 at a predetermined position, it is necessary to alternate, at high frequencies, the direction of the current passed through the coil 1 to return the holder 166 to the position detected by the position detection sensor 168. In this condition, the holder 166 seems to be stopped at the predetermined position, but actually, the holder 166 is slightly vibrating in this place in response to the high-frequency alternating current.

Thus, when the holder 166 is stopped by the application of electricity to the VCM, the moving target is not moved undesirably by external force. However, if the power of the VCM is turned off, no electromagnetic force acts on the holder 166, and the holder 166 is easily moved by small external force. For example, when the camera system 10 is disposed in the posture shown in FIG. 1, the holder 166 falls down by gravitation if the power of the VCM is turned off. Particularly when the camera is carried, the problem of chattering occurs due to vibrations. At worst, the imaging portion 117 can be shifted if a strong impact is externally given, for example, as a result of falling. This requires a mechanism which fixes the holder 166 at a home position when no electricity is applied to the VCM.

The fixing mechanism 110 for positioning and fixing the holder 166 at the home position after the holder 166 is stopped at the predetermined position by the VCM includes the positioning mechanism 180 and the press mechanism 190. The press mechanism 190 brings the positioning mechanism 180 into a pressure state (first position) and a non-pressure state (second position). The press mechanism 190 will be described in detail later. The positioning mechanism 180 includes a press plate 188 (support member), a first protrusion 183 (third engaging portion), a second protrusion 184 (fourth engaging portion), a first depression 185 (first engaging portion), and a second depression 186 (second engaging portion).

Here, the positioning mechanism 180 is first described.

For example, as shown in FIG. 4 and FIG. 5, the press plate 188 (extension) has a structure in which a second press plate 182 is stacked on a first press plate 181. The first press plate 181 is substantially T-shaped as shown in FIG. 3. The first press plate 181 is bent at one end and fixed to the frame 167, and thus attached to the frame 167 in a cantilever state substantially parallel to and at a distance from the holder 166. The first press plate 181 may be in any form as long as it has a low rigidity and is easily bent and displaced in a pressing direction (Z-axis direction) and as long as it has a high rigidity and is not easily deformed by external force in a direction (direction along the XY plane) that intersects at right angles with the pressing direction. In the present embodiment, a thin-plate-shaped elastic body (leaf spring) is used as the first press plate 181. The second press plate 182 comprises a rectangular plate-shaped body which is stacked on and fixedly connected to a free end of the first press plate 181 and which has a flexural rigidity higher than that of the first press plate 181 and which is not easily deformed even when press force of the press mechanism 190 is applied thereto.

The first protrusion 183 and the second protrusion 184 that will be described in detail later are attached to the press plate 188. The two protrusions 183 and 184 are disposed at positions where the second press plate 182 overlaps the first press plate 181, and are provided to protrude toward the holder 166. On the other hand, the first depression 185 and the second depression 186 are respectively provided at positions facing the protrusions 183 and 184 on the side of the holder 166. The structures and functions of the first and second depressions 185 and 186 will also be described in detail later.

If the press plate 188 of the positioning mechanism 180 is pressed toward the holder 166 by the press mechanism 190, the first protrusion 183 of the press plate 188 is pressed into and engaged with the first depression 185 of the holder 166, and the second protrusion 184 of the press plate 188 is pressed into and engaged with the second depression 186 of the holder 166. As a result, the holder 166 is precisely positioned relative to the press plate 188 particularly in the XY plane, and the holder 166 is fixed to the frame 167.

On the other hand, if the pressure on the press plate 188 by the press mechanism 190 is released, the first protrusion 183 and the first depression 185 as well as the second protrusion 184 and the second depression 186 are disengaged by the resilience of the first press plate 181. In this condition, the holder 166 can be freely driven in the XY plane (plane including the X-axis and the Y-axis) direction. That is, during the hand shake correction that operates the VCM to move the holder 166 along the XY plane, the holder 166 becomes movable along the XY plane as a result of the release of the pressure by the press mechanism 190.

Here, the structure of the positioning mechanism 180 is described in more detail.

The first press plate 181 is made of, for example, phosphor bronze for springs or stainless steel for springs. As shown in FIG. 5, a fixed end of the first press plate 181 is bent substantially at right angles into an L-shape. This bent end is fixed to a side surface 167b of a protruding wall 167a which is provided to protrude from the frame 167 in the Z-axis direction. At the same time, the end of the first press plate 181 is held between a highly rigid holding plate 187 and the side surface 167b of the protruding wall 167a of the frame 167, and then fastened and fixed by screws. When the first press plate 181 is fixed to the frame 167, the part of the first press plate 18 extending from the fixed portion 1 is structured to form a cantilever, and has low flexural rigidity and is easily bent in the Z-direction in FIG. 5, and has high flexural rigidity and is not easily displaced in the direction along the XY plane.

For example, the bending angle of the fixed end of the first press plate 181 may be designed to be an obtuse angle slightly larger than 90 degrees so that the free end is structured to slightly tilt upward when the fixed end is fixed to the side surface 167b of the protruding wall 167a of the frame 167 (e.g. indicated by a solid line in FIG. 12). This case is based on the condition that the side surface 167b of the protruding wall 167a of the frame 167 intersects at right angles with the movement plane of the holder 166 and that an upper end face 167c of the protruding wall 167a is parallel to the movement plane. When this structure is used, the first press plate 181 is slightly separated from the upper end face 167c of the protruding wall 167a, and the end of the first protrusion 183 and the end of the second protrusion 184 are evacuated to positions that do not interfere with the holder 166, if the first protrusion 183 and the first depression 185 are disengaged and the second protrusion 184 and the second depression 186 are disengaged by the resilience of the first press plate 181 as a result of the release of the pressure by the press mechanism 190.

On the other hand, the first press plate 181 contacts the upper end face 167c of the protruding wall 167a, and the second press plate 182 is disposed parallel to the movement plane of the holder 166, if the press plate 188 is pressed by the press mechanism 190 so that the first protrusion 183 is engaged with the first depression 185 and the second protrusion 184 is engaged with the second depression 186. This condition is illustrated in FIG. 5. In this condition, the press plate 188 is disposed parallel to the movement plane of the holder 166, and a shaft 183b of the first protrusion 183 and a shaft 184b of the second protrusion 184 intersect at right angles with the movement plane of the holder 166. The movement plane referred to here is a plane parallel to the XY plane, and serves as a reference plane for the movement of the holder 166.

The other end (free end) of the first press plate 181 extends to a position that contactlessly overlaps the front side of the holder 166 in the vicinity of the outer peripheral portion of the holder 166. The part of the first press plate 181 that overlaps the holder 166 is shaped to extend in the Y-direction, as shown in FIG. 3. The second press plate 182 has substantially the same shape as the part of the first press plate 181 extending in the Y-direction. The second press plate 182 is stacked on and then fastened and fixed by screws to the surface, which is located on the side that faces the holder 166, of the part of the first press plate 181 extending in the Y-direction.

Therefore, the unfixed free end of the first press plate 181 is increased in rigidity by the fixed connection of the second press plate 182, and is structured to be hardly deformed even under the press force of the press mechanism 190. On the contrary, if the end of the first press plate 181 is subjected to press force in the Z-direction, a part 181a between the fixed portion and the second press plate 182 is bent, and the second press plate 182 is hardly deformed and is displaced.

In the present embodiment, the press plate 188 is formed by two members: the first press plate 181 and the second press plate 182. However, the press plate 188 may have an integral configuration, or may be made of a resin material. If the press mechanism 190 is disposed so that the positions where the first protrusion 183 and the second protrusion 184 are disposed are directly pressed, the second press plate 182 may be eliminated, and the first protrusion 183 and the second protrusion 184 may be directly attached to the first press plate 181.

The first and second protrusions 183 and 184 are attached to the press plate 188 in the part where the second press plate 182 overlaps the first press plate 181. For example, as shown in FIG. 3 and FIG. 4, the first protrusion 183 is attached to the press plate 188 at an upper position in the Y-direction, and the second protrusion 184 is attached to the press plate 188 at a position located downwardly apart from the first protrusion 183 in the Y-direction. The attachment positions of the first protrusion 183 and the second protrusion 184 need to be located apart from each other. The distance therebetween determines the rate of the adjustment amount of the holder 166 to the operation amount of the second protrusion 184 in later-described rotational position adjustment of the holder 166. It is thus preferable to set the distance between the first and second protrusions 183 and 184 to a proper value in consideration of the adjustment amount of the holder 166.

The first and second protrusions 183 and 184 are attached to the press plate 188 as shown in FIG. 6. FIG. 6 is a sectional view showing how the second protrusion 184 is fitted in the second depression 186. The second protrusion 184 is different in structure from the first protrusion 183 in that the second protrusion 184 has an eccentric press-contact portion 184a (described later) provided with a conical surface 184c. However, the first protrusion 183 is also fixedly provided in the press plate 188 in the same way. Therefore, the attachment structure of the second protrusion 184 is only described here by way of example, and the attachment structure of the first protrusion 183 is not described in detail. That is, the second protrusion 184 passes through the first press plate 181 and the second press plate 182, and the shaft 184b of the second protrusion 184 is fitted in a hole 188a provided in the second press plate 182. As a result, the second protrusion 184 is attached to the press plate 188, and the shaft 184b is fixedly connected to the hole 188a by an adhesive 188b.

Particularly when the second protrusion 184 is fixed by the adhesive 188b, the shaft 184b that is rotated to a predetermined rotational position is fixed to the press plate 188. The shaft 184b is attached to the press plate 188 at such an attachment angle that the shaft 184b is put in a posture to intersect at right angles with the movement plane of the holder 166 when the press-contact portion 184a of the second protrusion 184 is fitted in the second depression 186 of the holder 166 as a shown. The press-contact portion 184a having the conical surface 184c that is eccentric relative to the shaft 184b is provided at the shown lower end of the shaft 184b of the second protrusion 184.

That is, the press-contact portion 184a is fixedly provided at the end of the shaft 184b eccentrically relative to the shaft 184b so that the central axis of the conical surface 184c and the central axis of the shaft 184b are parallel and located a distance δ (FIG. 3) apart from each other. Therefore, if the second protrusion 184 is rotated around the shaft 184b, the center of the conical surface 184c of the press-contact portion 184a can be moved in the XY plane direction. In other words, if the rotational position of the second protrusion 184 is adjusted to adhesively fix the second protrusion 184 to the press plate 188, the inclination and position of the holder 166 relative to the frame 167 in the XY plane can be adjusted as described later.

On the other hand, the first depression 185 and the second depression 186 are provided on the side of the holder 166 facing the first protrusion 183 and the second protrusion 184.

The first depression 185 has a conical surface 185a (conical portion) with which a conical surface 183c of a press-contact portion 183a of the first protrusion 183 comes into contact. The conical surface 185a of the first depression 185 is provided in the holder 166 at an angle that locates the conical surface 185a coaxially with the conical surface 183c of the press-contact portion 183a when the press-contact portion 183a of the first protrusion 183 is engaged with the first depression 185. That is, the conical surface 185a of the first depression 185 has an axis that intersects at right angles with the movement plane of the holder 166. In the present embodiment, the conical surface 185a of the first depression 185 is a depressed surface having a vertical angle equal to that of the conical surface 183c of the press-contact portion 183a of the first protrusion 183. When the first protrusion 183 is fitted in the conical surface 185a, the conical surface 183c of the press-contact portion 183a comes in close contact with the conical surface 185a of the first depression 185.

More specifically, in the present embodiment, the conical surface 183c of the press-contact portion 183a of the first protrusion 183 and the conical surface 185a of the first depression 185 are set at a vertical angle of 90° to 120°. The vertical angle of the conical surface affects the press force of two contact surfaces, holding force of the holder 166 by the fixing mechanism 110, and later-described centripetal force by the two conical surfaces. For example, when the vertical angle of the conical surface is less than 90°, the holding force against the press force increases. However, when the holder 166 is unfixed, great frictional force resulting from the contact of the conical surfaces acts, and biting occurs by a wedge principle, so that great force is needed for pressure release. On the other hand, when the vertical angle of the conical surface is more than 120°, the holding force against the press force decreases, and positional shifting is easily caused by external force.

The second depression 186 facing the second protrusion 184 has a wedge surface 186a (conical portion) with which the conical surface 184c of the eccentric press-contact portion 184a of the second protrusion 184 comes into contact. As described above, the press-contact portion 184a of the second protrusion 184 is eccentric relative to the shaft 184b, and the second depression 186 is shaped so that the conical surface is extended in the direction of the first depression 185. That is, the opening shape of the second depression 186 is oval, and the second depression 186 has a depressed surface shape that can always put the conical surface 184c of the press-contact portion 184a in close contact regardless of the rotational position of the second protrusion 184 (how the second protrusion 184 is fixed to the press plate 188). The opening shape of the second depression 186 is not exclusively oval and may be elliptic.

FIG. 3 and FIG. 4 are slightly exaggerated for ease of explanation. However, the eccentricity amount of the press-contact portion 184a of the second protrusion 184 is actually at a pixel pitch level (about 10 μm at the maximum), so that even if the second protrusion 184 is rotated to any rotational position and fixed to the press plate 188, the movement amount of the shaft of the press-contact portion 184a along the XY plane is small. Therefore, the wedge surface 186a of the second depression 186 that receives the eccentric press-contact portion 184a of the second protrusion 184 actually has such a shape that the conical surface 185a of the first depression 185 is slightly stretched in the Y-direction. More specifically, the wedge surface 186a of the second depression 186 has such a shape that the conical surface is cut in an XZ plane passing through the center of the conical surface and then the two parts are gently connected slightly apart from each other.

Here, the action of the positioning mechanism 180 is described in detail.

If the press plate 188 of the positioning mechanism 180 is pressed toward the holder 166 by the press mechanism 190 which will be described in detail later, the press-contact portion 183a of the first protrusion 183 is engaged with the first depression 185, and the press-contact portion 184a of the second protrusion 184 is engaged with the second depression 186. In this case, the press-contact portions 183a and 184a of the protrusions 183 and 184 have the conical surfaces 183c and 184c that converge toward the end of the pressing direction, and the conical surface 185a (wedge surface 186a) of the depressions 185 and 186 has a shape that expands toward the protrusions. Therefore, even if the holder 166 is shifted along the XY plane, the press-contact portions 183a and 184a of the protrusions can be easily fitted into the opposite depressions 185 and 186.

For example, when the press-contact portion 183a of the first protrusion 183 is pressed into the first depression 185, the conical surface 183c of the press-contact portion 183a comes into contact with the conical surface 185a of the first depression 185. Here, when the axis of the first protrusion 183 and the axis of the first depression 185 are shifted each other in the XY plane, the conical surface 183c of the press-contact portion 183a first comes into partial contact (single contact) with the conical surface 185a of the first depression 185, and the area of contact between the conical surfaces gradually increases accordingly. When the press-contact portion 183a is completely fitted in the first depression 185, the conical surfaces are entirely in close contact with each other. Here, the holder 166 is movable along the XY plane. Therefore, in accordance with the progress of the engaging operation, the holder 166 is moved (centripetally) along the XY plane toward the correspondence between the axis of the first protrusion 183 and the axis of the first depression 185. If the press-contact portion 183a of the first protrusion 183 is simply engaged with the first depression 185, the holder 166 is rotatable around an axis (engagement position) which has become coaxial as a result of the engagement of the press-contact portion 183a and the first depression 185.

On the other hand, if the press-contact portion 184a of the second protrusion 184 is pressed into the second depression 186, the holder 166 is, in the same manner, moved in a direction in which the axis (actually, the central line extending in the Y-direction) of the second depression 186 overlaps the shaft 184b of the second protrusion 184 by the action of the conical surface 184c of the press-contact portion 184a and the wedge surface 186a of the second depression 186, and the holder 166 is slightly rotated around the above-mentioned engagement position. In other words, the rotational position of the second protrusion 184 has only to be adjusted so that the holder 166 is disposed in a desired posture (angle) when the positioning mechanism 180 is actuated. For the camera system 10, it is necessary to dispose the holder 166 in a posture without any angular shift so that a large number of image pickup devices of the imaging portion 117 are aligned in the X-direction and the Y-direction. The rotational position of the second protrusion 184 is previously adjusted and fixed to the press plate 188 so that the holder 166 is disposed in the above posture.

Both the conical surfaces 183c and 185a that come into contact with the first protrusion 183 and the first depression 185 do not always need to be conical surfaces. The conical surfaces 183c and 185a may be in any shape that allows the holder 166 to move in a direction in which their central axes correspond to each other, that is, any shape that allows centripetal action to operate when press force acts on the contact portion. The plane in which the second protrusion 184 and the second depression 186 come into contact with each other may also be in any shape that allows aligning action to operate so that the axis line of the conical surface 184c of the second protrusion 184 overlaps the central line of the wedge surface 186a of the second depression 186 extending in the Y-direction.

For example, the press-contact portion 183a and/or 184a of the first protrusion 183 and/or the second protrusion 184 may be cylindrically or spherically shaped and thus come into contact with the conical surface 185a of the first depression 185 and/or the wedge surface 186a of the second depression 186. Alternatively, the vertical angles of the conical surfaces that come into contact with each other may be different, or the vertical angle of the conical surface of the protrusion may be slightly smaller than the vertical angle of the conical surface of the depression. Moreover, the surface may be shaped to allow the operation of the above-mentioned centripetal action and aligning action, and then a groove, for example, may be provided in the contact surface of the depression or protrusion to reduce the contact area.

Now, the press mechanism 190 is described with reference to FIG. 8 to FIG. 12.

Figure 8:
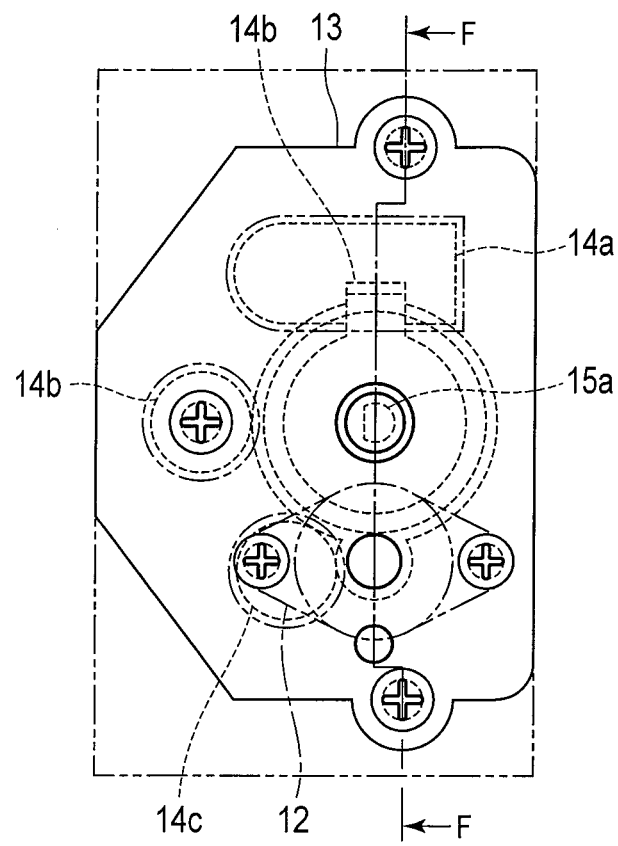
FIG. 8 is a front view showing the structure of essential parts of a press mechanism of the imaging portion moving mechanism incorporated in the camera system in FIG. 1.
Figure 9:
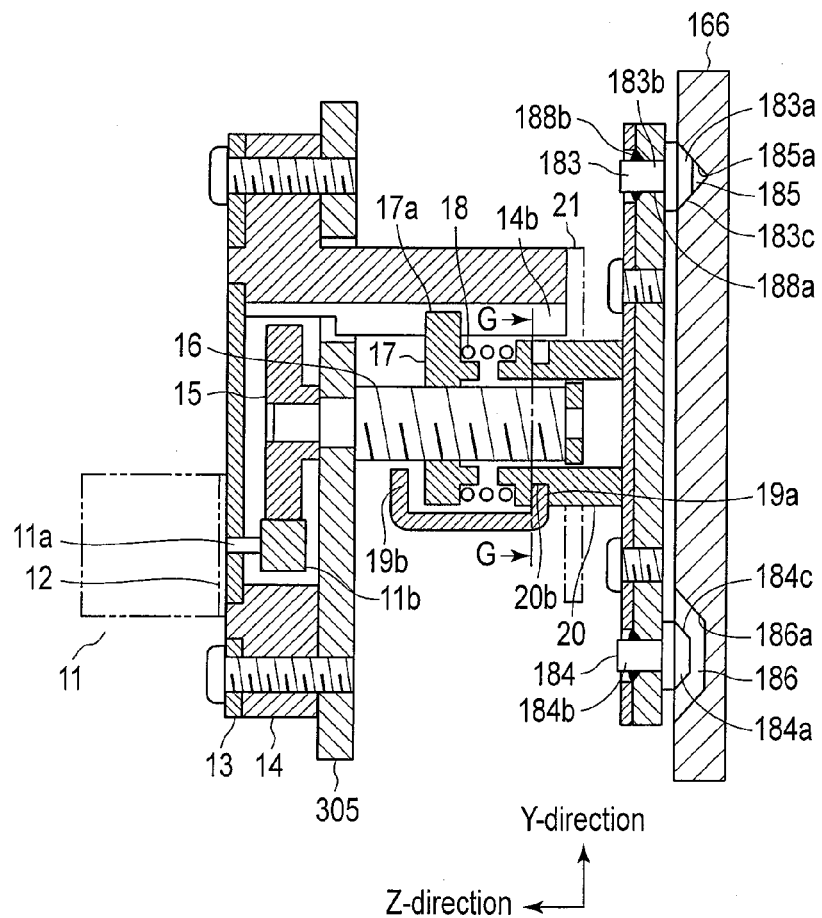
FIG. 9 is a longitudinal sectional side view (FF sectional view) of the essential parts of the press mechanism in FIG. 8 and the positioning mechanism in FIG. 3.
Figure 10:
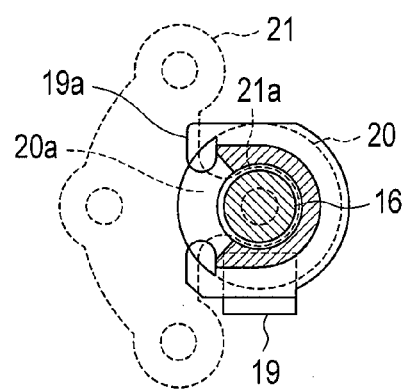
FIG. 10 is a partial sectional front view (GG sectional view) showing the structure of the essential parts of the press mechanism in FIG. 9.

FIG. 8 is a front view of the press mechanism 190. FIG. 9 is a sectional view of the press mechanism 190 taken along the line FF in FIG. 8. FIG. 10 is a sectional view of the press mechanism 190 taken along the line GG in FIG. 9. FIG. 11 is a sectional view of the press mechanism 190 in a non-pressure state taken along the line FF in FIG. 8. FIG. 12 is a sectional view of the unpressed positioning mechanism 180 taken along the line HH in FIG. 11.

As shown in FIG. 11, the press mechanism 190 is mechanically separated from the positioning mechanism 180 in the non-pressure state. That is, the press mechanism 190 according to the present embodiment is provided separately from the press plate 188 of the positioning mechanism 180, and stress from the press mechanism 190 does not act on the positioning mechanism 180. Therefore, when the above-described structure in which the press plate 188 of the positioning mechanism 180 is attached in a cantilever state to the frame 167 is used, the accuracy of the positions of the first and second protrusions 183 and 184 along the XY plane during pressure can be enhanced.

The press mechanism 190 has a body 14 screwed to a yoke 305 (FIG. 5) which is fixed to the frame 167 to extend to a position that overlaps the front side of the press plate 188. An upper plate 13 is disposed in front of the body 14 in the Z-direction, and this upper plate 13 is also fastened and fixed to the yoke 305 together with the body 14. A motor 11 is attached to the front part of the upper plate 13 via a seat 12. The seat 12 is fastened and fixed to the upper plate 13 by screws.

A pinion gear 11b is fixedly provided in a rotation shaft 11a of the motor 11. A gear 15 toothes the pinion gear 11b. The gear 15 is fixed to one end of a screw 16 (first screw member) by press fitting or adhesive bonding. In the present embodiment, one end of the screw 16 is D-shaped in section, and is inserted into a sectionally D-shaped hole 15a of the gear 15 so that the gear 15 is unrotatably fixed to one end of the screw 16. The shaft of the screw 16 on the side of the gear 15 is rotatably fitted in a hole of the yoke 305. The yoke 305 is held between a flange surface of the gear 15 and a step of the screw 16 so that the position of the screw 16 in the axial direction (Z-axis direction) is fixed.

On the other hand, the other end of the screw 16 is rotatably fitted in a hole of a lower plate 21 fixed to the end, which is on the side of the press plate 188, of a column 14a of the body 14 extending in the Z-direction. This prevents the screw 16 from coming off. Moreover, both ends of the screw 16 can be rotatably held, and the screw 16 can be rotated in a stable posture.

A nut 17 (second screw member) is threaded to the screw 16. The nut 17 is attached to the screw 16 before both ends of the screw 16 are attached to the upper plate 13 or the lower plate 21. On the other hand, a groove 14b extending in the axial direction of the screw 16 is formed in the column 14a of the body 14 extending parallel to the screw 16. A protrusion 17a projecting from the nut 17 threaded to the screw 16 is inserted into the groove 14b, and the rotation of the nut 17 is thereby prevented. Therefore, if the screw 16 is rotated by the motor 11, the nut 17 can be moved along the groove 14b in the Z-direction.

As shown in FIG. 10, the lower plate 21 is fastened and fixed to the body 14 at three places, and has a support piece 21a provided with a hole into which to fit the end of the screw 16. A substantially cylindrical presser 20 is axially movably attached to the end of the screw 16 on the side of the lower plate 21. The support piece 21a of the lower plate 21 extends into the presser 20 via a slit 20a of the presser 20. A helical compression spring 18 that is compressed is attached between the nut 17 and the presser 20. The spring 18 is annularly attached outside the screw 16 between the nut 17 and the presser 20, and both ends of the spring 18 are locked by a cylindrical step of the nut 17 and a cylindrical step of the presser 20. A groove 20b into which to fit a C-ring-shaped portion 19a of an engaging member 19 is fitted is formed in the outer peripheral surface of the presser 20. The engaging member 19 has, at the end extending from the C-ring-shaped portion 19a in the Z-direction, an engaging portion 19b which is engaged with the end face of the nut 17. The engaging member 19 links the presser 20 and the nut 17 so that the spring 18 intervenes therebetween. At a change from the pressure state in FIG. 9 to the non-pressure state in FIG. 11, the engaging member 19 functions to move the presser 20 away from the press plate 188 in accordance with the nut 17 which moves away from the press plate 188.

In the present embodiment, the press plate 188 of the positioning mechanism 180 is in a cantilever state extending along the XY plane to minimize the size of the fixing mechanism 110 in the Z-axis direction. It is therefore preferable to minimize the press mechanism 190 that overlaps in the Z-axis direction of the positioning mechanism 180, and also minimize its press force. Thus, in the present embodiment, the first press plate 181 of the press plate 188 of the positioning mechanism 180 is reduced in thickness to reduce the spring constant. Specifically, the first press plate 181 is selected so that the resilience of the spring 18 will be about 1/10 of the press force by the press mechanism 190. Therefore, the separation of the conical surface of the protrusion and the conical surface of the depression is designed to be encouraged when the first protrusion 183 and the first depression 185 are disengaged and the second protrusion 184 and the second depression 186 are disengaged by the use of the resilience of the press plate 188.

Now, the operation of the imaging portion moving mechanism 159 having the above configuration is described.

In a hand shake correction mode, the X-axis gyro 160 detects the angular velocity of the turning (shake) of the camera system 10 around the X-axis, the Y-axis gyro 161 detects the angular velocity of the turning of the camera system 10 around the Y-axis, and the Z-axis rotation detector 170 detects the angular velocity of the turning of the camera system 10 in the XY plane and the rotation central position. An X-axis acceleration sensor 171 detects the acceleration of the camera system 10 in the XY plane in the X-axis direction. A Y-axis acceleration sensor 172 detects the acceleration of the camera system 10 in the XY plane in the Y-axis direction. The X-axis gyro 160, the Y-axis gyro 161, the Z-axis rotation detector 170, the Y-axis acceleration sensor 171, and the Y-axis acceleration sensor 172 function as a detector according to this invention. The vibration-proof control circuit 162 calculates a hand shake correction amount from the angular velocity and the rotation central position of the camera system 10 detected by the detector, and moves the imaging portion 117 by the driver 300 to correct the shake, thereby correcting the hand shake. The configuration of the actuator which moves the imaging portion 117 uses the VCM in the imaging portion moving mechanism 159 according to the present embodiment, but is not limited to the VCM and may use, for example, a rotary motor, a linear motor, or an ultrasonic motor.

As described above, when the camera system 10 operates in the hand shake correction mode, the fixing mechanism 110 unfixes the holder 166 from the frame 167 in advance. On the other hand, when the camera system 10 has turned off the hand shake correction mode, the fixing mechanism 110 fixes the holder 166 to the frame 167. As described above, the fixing mechanism 110 according to the present embodiment can accurately position and fix the holder 166 holding the imaging portion 117 at the home position (neutral position) along the XY plane. Therefore, unlike heretofore, it is not necessary to apply electricity to the VCM to keep the imaging portion 117 at the home position where imaging can be performed, and imaging can be performed without the application of electricity to the VCM. Consequently, electric power consumption can be reduced, and the time that allows the camera system 10 to be used by one charging can be increased.

As described above, in the camera system 10 according to the present embodiment, imaging can be performed without the application of electricity to the VCM. Thus, it is not necessary to consider the effect of noise based on the vibrations of the VCM in contrast with the conventional imaging performed with the application of electricity to the VCM. Consequently, it is possible to obtain clearer images not only in still image photography but also in moving image photography.

The press mechanism 190 which functions as the actuator of the fixing mechanism 110 also has a structure that can reduce the electric power consumption of the camera system 10.

For example, when the press plate 188 of the positioning mechanism 180 is pressed by the press mechanism 190 to fix the holder 166 to the frame 167, the actuator drive circuit 169 rotates the motor 11 of the press mechanism 190 in a predetermined direction. If the motor is rotated in the predetermined direction, the gear 15 rotates, and the screw 16 combined with the gear 15 rotates. Then the nut 17 threaded to the gear 15 moves in the rotation axis direction of the screw 16 and thus pushes down the spring 18, and presses the presser 20 against the first press plate 181. As a result, the press plate 188 is displaced so that the holder 166 is fixed.

If the nut 17 is displaced in a predetermined amount as described above at this point, this position is detected by an unshown position detector such as a photointerrupter to stop the rotation of the motor 11. That is, the application of electricity to the motor 11 is stopped. Then the spring 18 is most compressed as shown in FIG. 9, and the force generated by the spring 18 causes the presser 20 to press the first press plate 181 and causes the positioning mechanism 180 to keep the holder 166 at the predetermined home position.

According to the press mechanism 190 having the structure described above, if the application of electricity to the motor 11 remains stopped in this condition, the nut 17 does not move, and the holder 166 is not unfixed. That is, in this mechanism, great frictional force works between the nut 17 and the screw 16, and the force that rotates the nut 17 and the screw 16 relative to each other is small. Therefore, even if the motor 11 is turned off, the screw 16 is not rotated in the reverse direction by the resilience of the spring 18, and the holder 166 can be kept at the home position without the consumption of electric power. Thus, when the camera is carried with its power supply shut off, the problem of the holder holding the imaging portion that chatters as heretofore can be prevented. Even if a strong impact is given, for example, as a result of falling, the problem of the positional shift of the imaging portion 117 can be prevented.

On the other hand, when the holder 166 is unfixed in response to the switch of the operation mode of the camera system 10 to the hand shake correction mode, the actuator drive circuit 169 rotates the motor 11 of the press mechanism 190 in the reverse direction. In this case, the actuator drive circuit 169 applies electricity to the VCM before rotating the motor 11 in the reverse direction, and holds the holder 166 at the home position by electromagnetic force. This prevents the problem of the falling of the holder 166 in a gravitational direction immediately after the fixing by the fixing mechanism 110 is released.

If the motor 11 is rotated in the reverse direction while the holder 166 is being held at the home position by the electromagnetic force of the VCM, the nut 17 is displaced away from the holder 166, and finally comes into collision with the engaging portion 19b of the engaging member 19 and displaces the engaging member 19. At this moment, as the engaging member 19 is fixedly connected to the presser 20, the presser 20 moves away from the first press plate 181, and the pressure by the press mechanism 190 is released. As a result, the first press plate 181 moves away from the holder 166 by its spring force, and disengages the first protrusion 183 and the first depression 185 and disengages the second protrusion 184 and the second depression 186.

Ideally, the press plate 188 of the positioning mechanism 180 moves in a direction to release fixing if the pressure by the press mechanism 190 is released as described above. However, if the first depression 185 is in close contact with the press-contact portion 183a of the first protrusion 183 and if the second depression 186 is in close contact with the press-contact portion 184a of the second protrusion 184, it is possible that the engagement is not released because of the frictional force between each press-contact portion and each depression even after the pressure by the press mechanism 190 is released. Particularly, in the present embodiment, as described above, the size of the press mechanism 190 is minimized so that the positioning mechanism 180 is operated by relatively weak press force, and the first press plate 181 of the press plate 188 to be pressed is therefore reduced in thickness to reduce the spring force. Thus, the resilience of the press plate 188 is also relatively weak, and the force to disengage the protrusion and the depression in response to pressure release is also weak. It is possible that the problems described above may occur under these circumstances.

In contrast, according to the present embodiment, electricity is applied to the VCM before the pressure by the press mechanism 190 is released, so that the above-mentioned problems can be solved. That is, owing to the characteristics of the VCM, a high-frequency alternating current is passed through the coil to hold the holder 166 at a fixed position, as described above. Therefore, in this situation, the holder 166 to be held is slightly vibrated. In this case, the direction of the vibrations runs substantially along the XY plane. The vibrations running along the XY plane are converted to force in a direction that separates the conical surface of the protrusion from the conical surface of the depression in the contact surface therebetween. That is, in response to the vibrations, the press-contact portion and the depression come out of close contact, and the press-contact portions 183a and 184a of the first and second protrusions 183 and 184 of the positioning mechanism 180 are satisfactorily separated from the corresponding first and second depressions 185 and 186. The frequency and amplitude of the vibrations of the VCM can also be modified by the change of the frequency and value of the current to be passed through the coil. A frequency and amplitude of vibrations that can satisfactorily separate the contact surfaces of the conical surface of the protrusion and the conical surface of the depression may be selected.

An unshown position detector such as a photointerrupter detects that the position of the nut 17 has been driven to a disengagement position. In accordance with this detection signal, the actuator drive circuit 169 stops the motor 11. Although the disengagement is dependent on the spring force of the first press plate 181 in this configuration, it should be appreciated that an engaging portion to be engaged with the press plate 188 may be provided in the engaging member 19 and directly lift the press plate 188 to release the engagement.

When the pressure by the press mechanism 190 is released to release the fixing by the fixing mechanism 110 as described above, a space Z is formed between the first and second protrusions 183 and 184 and the holder 166 as shown in FIG. 11. In this condition, the holder 166 is freely displaceable relative to the frame 167 along the XY plane.

The imaging portion moving mechanism 159 having the configuration described above enables what is known as hand shake correction of an image pickup device shift type wherein the imaging portion 117 is moved in accordance with the movement of the camera system 10 to inhibit the shake of a subject image in the imaging portion 117 resulting from the movement of the camera system 10. According to the present embodiment described above, the present invention is applied to the structure that enables the hand shake correction of the image pickup device shift type. However, it should be appreciated that the present invention may be applied to a lens shift type that moves the photography lens to correct a hand shake.

Now, the operation of the camera system 10 according to the present embodiment is described with reference to a flow-chart shown in FIG. 13.

Figure 13:
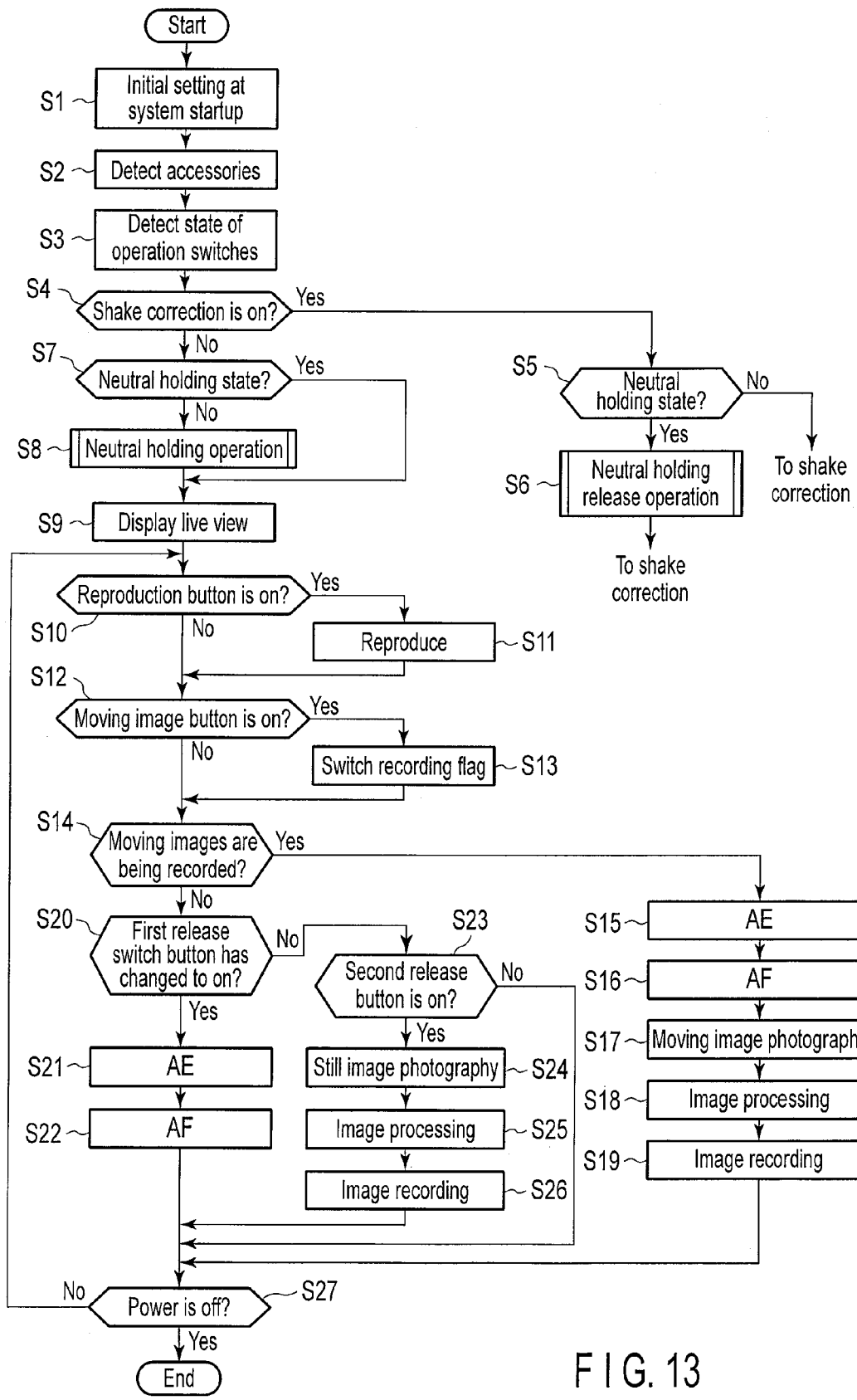
FIG. 13 is a flowchart illustrating the basic operation of the camera system in FIG. 1.

When power is turned on in response to the operation of a power button, the Bµcom 101 starts the operation of the main flow shown in FIG. 13.

After the start of the operation, the Bµcom 101 first performs initialization at system startup, and in this process, initializes a recording flag to an off-state (step S1). This recording flag is a flag that indicates whether moving images are being recorded. The recording flag that is on indicates that moving images are being recorded. The recording flag that is off indicates that moving images are not being recorded.

When the initialization at system startup is finished, the Bµcom 101 detects accessories such as the lens unit 200 connected to the body unit 100 (step S2), and detects the state of operation switches such as a reproduction button (step S3).

The Bµcom 101 then judges whether a shake correction mode switch is on (step S4). If the operation mode of the camera system 10 is the shake correction mode (step S4; YES), the Bµcom 101 judges whether the imaging portion 117 is held at an optical axis central position (home position) by the fixing mechanism 110 (step S5). If the imaging portion 117 is not in a neutral holding state (step S5; NO), the Bµcom 101 starts the shake correction operation. On the other hand, when it is determined in step S5 that the holder 166 is held at the home position by the fixing mechanism 110 and that the imaging portion 117 is held in the neutral holding state, the Bµcom 101 performs a neutral holding release operation to release the fixing by the fixing mechanism 110 (step S6), and starts the shake correction operation.

On the other hand, when it is determined in step S4 that the operation mode is not the shake correction mode (step S4; NO), the Bµcom 101 judges whether the imaging portion 117 is in the neutral holding state (step S7). When it is determined in step S7 that the imaging portion 117 is not in the neutral holding state (step S7; NO), the Bµcom 101 performs a neutral holding operation to fix the holder 166 at the home position by the fixing mechanism 110 (step S8). If the imaging portion 117 is in the neutral holding state (step S7; YES), the Bµcom 101 then proceeds to a sequence for normal photography.

The Bµcom 101 then displays a live view (step S9). Here, the imaging portion 117 acquires an image signal, processes the images for the display of the live view, and displays the live view on the image display device 123. In this condition, the Bµcom 101 judges whether the reproduction button is pressed (step S10). If it is judged that the reproduction button is pressed (step S10; YES), the Bµcom 101 reproduces the images (step S11). Here, the Bµcom 101 reads image data from the recording medium 127, and displays the image data on the image display device 123.

If the reproduction button is not pressed after the reproduction in step S11 or not pressed in step S10 (step S10; NO), the Bµcom 101 performs processing in step S3 to step S8, and then judges whether a moving image button is pressed (step S12). In step S12, the Bµcom 101 detects the operation of the moving image button in the camera operation section 131, and makes a judgment in accordance with the detection result.

When it is determined in step S12 that the moving image button is pressed (step S12; YES), the Bµcom 101 switches the recording flag (step S13). As described above, the start and end of the moving image photography are alternated every time the moving image button is pressed. Thus, in this step, the recording flag that is off is switched on, and the recording flag that is on is switched off.

After the recording flag is switched in step S13 or when it is judged in step S12 that the moving image button is not pressed (step S12; NO), the Bµcom 101 then judges whether moving images are being recorded (step S14). The recording flag that is on indicates that moving images are being recorded. Thus, here, whether moving images are being recorded is judged by whether the recording flag is on.

When it is judged in step S14 that moving images are not being recorded (step S14; NO), the Bµcom 101 judges whether a first release is pressed, i.e., whether a first release switch is changed from off to on (step S20). The camera operation section 131 detects the state of the first release switch interlocked with a release button, and the Bµcom 101 makes a judgment in accordance with this detection result. In step S20, whether the first release switch is changed from off to on is judged, and if the on-state is maintained, the judgment result is NO.

When it is judged in step S20 that the first release is pressed (step S20; YES), an image is obtained at the time when the first release is pressed, and AE is performed (step S21). In the imaging here, an image signal is acquired by the imaging portion 117, the image is processed, and image data for use in the AE is acquired. The image data is not recorded in the recording medium 127.

In this AE, the image processor 126 measures the brightness of the subject from the image data, and determines exposure control values such as an aperture value and a shutter speed, and also determines a control value for displaying, with proper exposure, the live view to be displayed on the image display device 123.

After the AE is thus performed, AF is then performed (step S22). Here, the focus lens 202a is wobbled, and the image processor 126 evaluates the contrast of the image data acquired by the imaging portion 117 to detect the direction of the focal position. At the same time, the focus lens 202a is moved in a detection direction by the Lµcom 201, and the focus lens 202a is driven and controlled so that the image has the highest contrast.

When it is judged in step S20 that the release button is not pressed and the first release switch is not changed from off to on (step S20; NO), the Bµcom 101 performs processing in step S3 to step S8, and then judges whether a second release is pressed, i.e., whether the release button is fully pressed and a second release switch is changed from off to on (step S23). In step S23, the camera operation section 131 detects the state of the second release switch interlocked with the release button, and the Bµcom 101 makes a judgment in accordance with this detection result.

When it is judged in step S23 that the second release is pressed (step S23; YES), the Bµcom 101 performs still image photography (step S24). Here, the imaging portion 117 performs exposure, acquires an image signal corresponding to a subject image, and temporarily stores the image signal in the SDRAM 124. After the still image photography is thus performed, the image processor 126 then reads the image signal from the SDRAM 124, and performs image processing of the image data of still images based on the image signal (step S25), and further performs image compression processing and then records the images in the recording medium 127 (step S26).

When it is judged in step S14 that moving images are being recorded (step S14; YES), the Bµcom 101 performs an AE operation as in step S21 (step S15). The Bµcom 101 further performs an AF operation in the same manner (step S16), and then performs moving image photography (step S17). Here, the imaging portion 117 acquires an image signal of the moving images, and the image processor 126 performs image processing of the image data (step S18), and after the compression of the moving images, the image data of the moving images is recorded in the recording medium 127 (step S19).

The Bµcom 101 then judges whether the power switch of the camera operation section 131 is turned off (step S27) when the AF operation is finished in step S22 or when it is judged in step S23 that the release button is not fully pressed (step S23; NO) or when the recording of the image data of the still image in the recording medium 127 is finished in step S26 or when the recording of the image data of the moving images in the recording medium 127 is finished in step S19. When it is judged that the power is not off (step S27; NO), the Bµcom 101 returns to the processing in step S10. On the other hand, when it is judged that the power is off (step S27; YES), the Bµcom 101 finishes the main flow after performing the operation to end the main flow.

Figure 14:
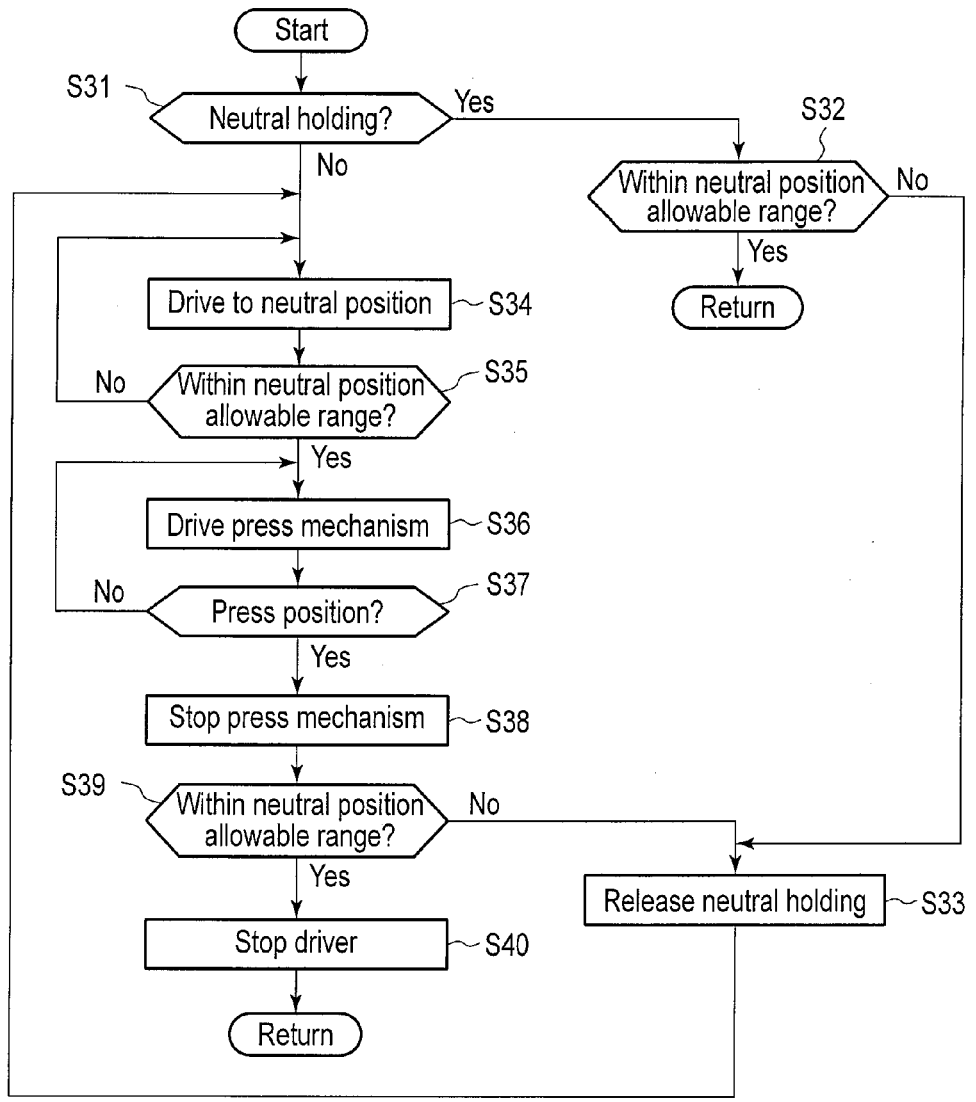
FIG. 14 is a flowchart illustrating a neutral holding operation in FIG. 13.

FIG. 14 is a flowchart illustrating the neutral holding operation (step S8) in the flowchart of FIG. 13.

In step S31, the Bµcom 101 judges whether the imaging portion 117 is in the neutral holding state. In step S31, the Bµcom 101 uses the position detector to detect the position of the nut 17 of the press mechanism 190, and thereby determines whether the holder 166 is fixed at the home position by the fixing mechanism 110, and judges whether the imaging portion 117 is neutrally held. The determination in step S31 is the same as the determination in step S7 in FIG. 13. The neutral holding state referred to here indicates that the holder 166 is mechanically fixed to the frame 167 by the fixing mechanism 110.

When it is determined in step S31 that the imaging portion 117 is in the neutral holding state (step S31; YES), the Bµcom 101 further determines whether the imaging portion 117 is located within a neutral position allowable range (step S32). In this determination in step S32, the Bµcom 101 detects the position of the holder 166 by the position detection sensor 168, and judges whether the imaging portion 117 is located within the allowable range (step S32). The neutral position allowable range referred to here indicates that the imaging portion 117 is positioned and fixed such that the imaging portion 117 can perform photography in this posture. If the imaging portion 117 is located within the allowable range, the neutral holding operation is finished.

On the other hand, when it is determined in step S32 that the imaging portion 117 is not located within the allowable range (step S32; NO), that is, when the imaging portion 117 remains as it is and is not put in a posture that permits photography even though the holder 166 is fixed at the home position by the fixing mechanism 110, the Bµcom 101 drives the press mechanism 190 of the fixing mechanism 110 to unfix the holder 166 and thus temporarily release the neutral holding state (step S33), and returns to step S34.

On the other hand, when it is judged in step S31 that the imaging portion 117 is not in the neutral holding state (step S31; NO), that is, when the fixing of the holder 166 by the fixing mechanism 110 is released, the Bµcom 101 detects the position of the holder 166 by the position detection sensor 168, and at the same time controls the actuator drive circuit 169 to actuate the X-axis actuator 163 and the Y-axis actuator 164 of the driver 300. Here, the Bµcom 101 controls the actuator drive circuit 169 to operate the VCM so that the imaging portion 117 held by the holder 166 is brought to a predetermined neutral position (step S34).

The Bµcom 101 then determines whether the imaging portion 117 is located within the neutral position allowable range. In this case, the Bµcom 101 detects the position of the holder 166 by the position detection sensor 168 to judge whether the imaging portion 117 is located within the neutral position allowable range (step S35). It is determined in step S35 whether the holder 166 is located within a positional range where the holder 166 can be positioned by the positioning mechanism 180 of the fixing mechanism 110. When the imaging portion 117 is not in the neutral position allowable range (step S35; NO), the Bµcom 101 continues the operation in step S34. On the other hand, when the imaging portion 117 is in the neutral position allowable range (step S35; YES), the Bµcom 101 operates the motor 11 of the press mechanism 190, and the press plate 188 of the positioning mechanism 180 is pressed so that the first protrusion 183 and the first depression 185 as well as the second protrusion 184 and the second depression 186 are pressed and engaged (step S36).

Here, in step S37, the Bµcom 101 checks whether the press force to press and engage the first protrusion 183 and the first depression 185 as well as the second protrusion 184 and the second depression 186 is proper. In this case, the Bµcom 101 uses the position detector to detect the position of the nut 17, and thus judges whether the pressure by the press mechanism 190 is normal (step S37). If the nut 17 is located at a predetermined position, the Bµcom 101 stops the motor 11 to stop the pressing of the positioning mechanism 180 by the press mechanism 190 (step S38).

On the other hand, when it is judged in step S37 that the nut 17 is not located at the predetermined position and is not located at a proper press position (step S37; NO), the Bµcom 101 returns to step S36, and continues the driving of the motor 11.

In step S39, the Bµcom 101 judges whether the imaging portion 117 is located within the neutral position allowable range as in the processing in step S32. If the imaging portion 117 is not located within the allowable range (step S39; NO), the Bµcom 101 returns to step S33 to again perform the neutral holding operation. Although the number of redoing neutral holding is not shown, the neutral holding operation is stopped when a predetermined number has been reached, and a warning is indicated on the display of the camera 10. On the other hand, when it is determined in step S39 that the imaging portion 117 held by the holder 166 fixed at the home position is located within the neutral holding position allowable range (step S39; YES), the Bµcom 101 stops the operation of the driver 300 (step S40), and then finishes the neutral holding operation.

FIG. 15 is a flowchart illustrating a neutral holding release operation in step S6 of FIG. 13.

In step S51, the Bµcom 101 drives the VCM-XA 320a, the VCM-XB 320b, and the VCM-Y 321 of the driver 300, and thereby drives the imaging portion 117 to the neutral position. In this condition, the press mechanism 190 is pressing the positioning mechanism 180, so that the imaging portion 117 hardly changes its position. In the present embodiment, at this point, a high-frequency alternating current is passed through the coils of the VCM-XA 320a, the VCM-XB 320b, and the VCM-Y 321 of the driver 300, as described above. Therefore, each VCM performs a sinusoidal vibration operation having predetermined amplitude to facilitate the release of the engagement of the first protrusion 183 and the first depression 185 as well as the engagement of the second protrusion 184 and the second depression 186.

At this point, substantially simultaneously with the processing in step S51, the Bµcom 101 rotates the motor 11 of the press mechanism 190 in a direction opposite to that in the pressing operation, and displaces the nut 17 to gradually decrease the force of the press mechanism 190 to press the positioning mechanism 180 (step S52).

In step S53, the Bµcom 101 detects the position of the presser 20 of the press mechanism 190 and the position of the first press plate 181 of the positioning mechanism 180, and determines whether the press mechanism 190 of the fixing mechanism 110 is in a pressure-release state. In the determination in step S53, the Bµcom 101 detects the position of the nut 17 to detect the state of the press mechanism 190, and judges whether pressure is released at this position.

If it is judged in step S53 that the pressure of the press mechanism 190 and the positioning mechanism 180 is released (step S53; YES), the Bµcom 101 ends the neutral holding release operation. On the other hand, when it is judged that the pressure is not released (step S53; NO), the Bµcom 101 returns to the processing in step S52, and then continues the driving of the motor 11 of the press mechanism 190 and continues the displacement of the position of the nut 17.

Now, a shift adjustment function by the fixing mechanism 110 according to the present embodiment is described with reference to FIG. 16.

In the present embodiment, the first protrusion 183 and the second protrusion 184 are respectively pressed and held to the first depression 185 and the second depression 186 by the press mechanism 190. Thereby, the holder 166 is fixed to the home position, and at the same time positioned relative to the frame 167 along the XY plane. However, the positional accuracy of the frame 167 and the holder 166 is determined by the relative positional accuracy of the first protrusion 183, the second protrusion 184, the first depression 185, and the second depression 186, and extremely high component accuracy and assembly accuracy (specifically, the pixel pitch level of the imaging portion) need to be maintained. Thus, in the present embodiment, the inclination and position of an imaging area of the imaging portion 117 dependent on the variations of the components and assembly are adjusted in the fixing mechanism 110, so that high component accuracy and assembly accuracy do not need to be maintained, and the camera system 10 that is easy to manufacture is provided.

The structure for this purpose has already been described. That is, the pressure surfaces of the first protrusion 183 and the first depression 185 are conical surfaces, and mutually exert a centripetal function when pressed. Thus, the positions of the holder 166 and the frame 167 in the XY plane are determined so that the vertexes of the respective cones overlap a centripetal point C in FIG. 16. Here, the holder 166 and the frame 167 are relatively rotatable around an axis (Z-axis) which passes through the centripetal point C and which is perpendicular to the surface of the drawing. In the meantime, the second protrusion 184 constituting the conical surface 184c and the second depression 186 constituting the wedge surface 186a are also pressed. Therefore, the relative rotation of the holder 166 and the frame 167 is regulated, and the positions of the holder 166 and the frame 167 in the XY plane are fixed.

For example, if the shaft 184b of the second protrusion 184 is rotated in this condition, the inclination θ of the imaging area of the imaging portion 117 where a photographic image can be generated can be corrected relative to the frame 167 because the axis of the cone of the press-contact portion 184a is eccentric relative to the shaft 184b. In FIG. 16, the holder 166 before correction and the imaging area before correction are indicated by broken lines. When the inclination θ is corrected, the imaging area is shifted ΔX and ΔY in the X-direction and the Y-direction from the state before correction. The shifts ΔX and ΔY can be corrected by shifting the position where an image is cut out from the imaging area. To this end, the positions of cut-out ranges can be stored in the nonvolatile memory 128, and a specified cut-out range can be cut out by the image processor 126 at the time of image processing. This can be achieved by a simple configuration. The image cut-out range for the imaging area is indicated by a two-dot chain line in FIG. 16. In the camera system 10 having the hand shake correction function, a large imaging area is set for the image cut-out region, so that a margin for the hand shake correction is allowed. On the other hand, pixels constituting the imaging portion 117 are arranged in lattice form. Therefore, if an image is cut out from the imaging area having the inclination θ, the cut-out of the image is complicated, and the part around the cut-out area is stepped. Thus, according to the present embodiment, the shaft 184b of the second protrusion 184 is rotated to adjust the rotational position of the press-contact portion 184a, and the inclination θ of the imaging portion 117 is accurately corrected.

Now, the relation between the holding force of the holder 166 by the fixing mechanism 110 according to the present embodiment and external force is described with reference to FIG. 16 and FIG. 17. FIG. 17 is a sectional bottom view taken along the line JJ in FIG. 16.

Figure 16:
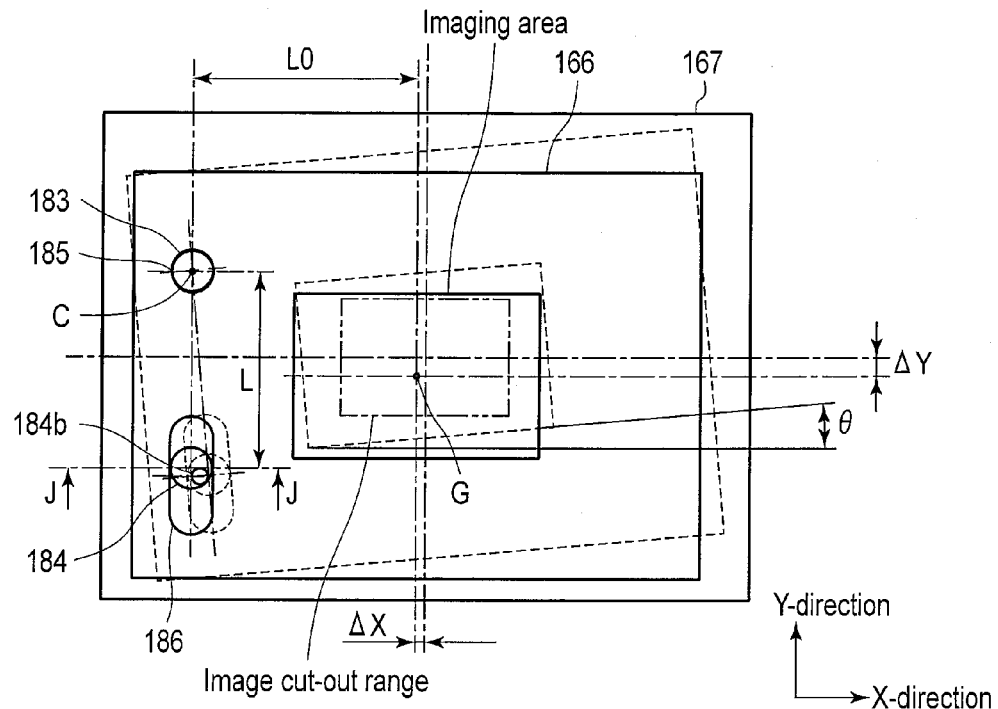
FIG. 16 is an operation explanatory diagram illustrating how the position of an imaging portion is adjusted by a fixing mechanism of the imaging portion moving mechanism in FIG. 3.
Figure 17:
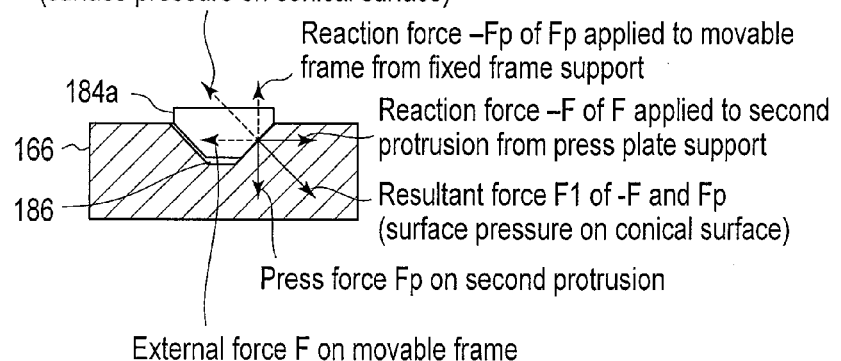
FIG. 17 is a partial cross sectional bottom view (JJ sectional view) illustrating the relation between holding force by the fixing mechanism in FIG. 16 and external force.

As shown in FIG. 16, the prerequisite is as follows: the distance between a gravity center G of the holder 166 and the above-mentioned centripetal point C along the X-direction is L0, the distance between the centripetal point C and the vertex of the conical surface 184c of the press-contact portion 184a of the second protrusion 184 is L, and the mass of the holder 166 and the imaging portion 117 is m. Strictly speaking, the distance L is the distance between the contact point of the second protrusion 184 and the second depression 186 and the centripetal point C. However, as the distance L is sufficiently great as compared with the diameter of the conical surface 184c, the distance L is set from the centripetal point C to the vertex of the conical surface 184c.

If vibrations or impact is applied or an acceleration α (FIG. 17) is applied by gravity to the holder 166 fixed by the fixing mechanism 110, moment of inertia m×α×L0 is generated around the centripetal point C and rotates the holder 166 around the axis which passes through the centripetal point C and which is perpendicular to the surface of the drawing. This rotation is stopped by the pressure engagement of the second protrusion 184 and the second depression 186, which is shown in FIG. 17.

If the acceleration a acts on the holder 166, external force F=(m×α×L0)/L is applied to the contact point of the second protrusion 184 and the second depression 186. Given that there is no frictional force and that the second depression 186 is in contact with the second protrusion 184 on one side of the conical surface 184c, reaction force −F of the external force F is applied to the second protrusion 184 via the frame 167 and the press plate 188. Here, the reaction force −F and press force Fp are applied to the second protrusion 184, and resultant force F1 of the reaction force −F and the press force Fp is applied as surface pressure in a direction perpendicular to the conical surface 184c. On the other hand, the holder 166 is subjected to the external force F and reaction force −Fp of the press force Fp received through the ball 314 from the frame 167 which is a fixed frame. Resultant force F2 of the external force F and the reaction force −Fp is applied as surface pressure of the wedge surface 186a of the second depression 186. FIG. 17 conceptually shows F1 and F2 that are balanced. In FIG. 17, the vertical angle of the conical surface 184c is 90°, and F=Fp. Thus, if the pressure is applied with force equal to the external force, the pressure holding is maintained. F<Fp in actual design. The conical surface 184c of the second protrusion 184 contacts not on one side but both sides of the wedge surface 186a of the second depression 186. This enables stable holding.

(Modification of the Press Mechanism 190)

Figure 18:
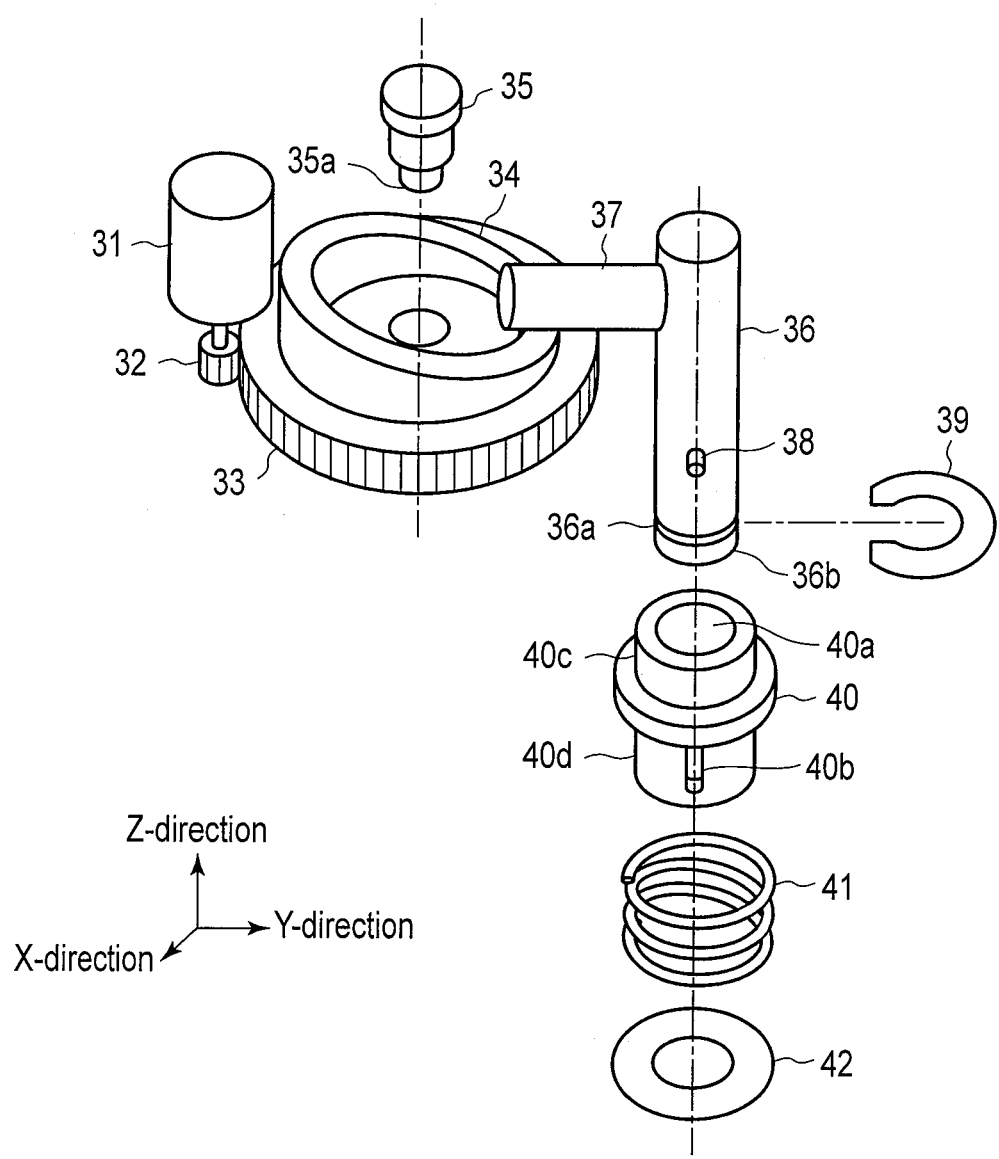
FIG. 18 is an exploded perspective view of the essential parts showing a modification of the press mechanism according to the embodiment.

FIG. 18 is an essential part exploded perspective view showing a modification of the press mechanism 190. Here, the components of a drive transmission mechanism of the press mechanism are mainly shown in an exploded form, and structural parts that support these components are not shown. Accordingly, in the following explanation, the structural parts functioning in the same manner as the press mechanism 190 according to the embodiment described above are referred to by the same names as those in the embodiment.

A press mechanism according to this modification has a motor 31 fixed to an unshown upper plate. A pinion gear 32 fixed to a rotation shaft of the motor 31 toothes a gear 33. The gear 33 is rotatably held to an unshown yoke via a shaft 35. The shaft 35 has a flange at one end, and has a fixing portion 35a at the other end. The fixing portion 35a is fitted into a hole of the yoke and thus fixed to the yoke by welding or caulking. The gear 33 comprises a cam 34 having a cam surface formed in a rotation axis direction.

The press mechanism has a press shaft 36 which presses the press plate 188 of the positioning mechanism 180. A cam pin 37 provided at one end of the press shaft 36 to protrude in a direction perpendicular to the axial direction is in contact with the cam surface of the cam 34. The press shaft 36 is fitted in a bearing 40 having a fit hole 40a in the center, and is guided movably in the axial direction. The bearing 40 has a fixed portion 40c fitted in a hole of an unshown yoke, and is fixed by welding or caulking. After the press shaft 36 is inserted through the bearing 40, a pin 38 is put through a groove 40b and then pressed and fixed into a hole provided in the press shaft. The rotation of the press shaft 36 around its axis is thereby prevented.

A helical compression spring 41 is annularly attached to a holding potion 40d of the bearing 40. After the press shaft 36 is inserted through the bearing 40, the spring 41 is compressed. A washer 42 is then fitted to the bearing 40, and a C-ring is fitted into a circumferential groove provided at the end of the bearing 40. The spring 41 is thereby held. If the position of a press portion 36b is set so that the force of the compressed spring 41 is applied to the press plate 188 of the positioning mechanism 180, a condition similar to the press mechanism 190 in FIG. 9 is obtained.

When the press mechanism according to the modification described above is actuated to press the press plate 188 of the positioning mechanism 180, the gear 33 is rotated to a shown position so that the press portion 36b of the press shaft 36 is projected toward the press plate 188 by the resilience of the spring 41. On the other hand, to release the pressure, the motor 31 is rotated from the state shown to rotate the cam 34 by 180°. Accordingly, the cam 34 pushes the press shaft 36 in an upward direction in FIG. 9, and the spring 41 is compressed. As a result, the press portion 36b moves away from the press plate 188, and the pressure is released.

In this modification, as the press portion 36b is displaced by the cam 34, the lift amount of the cam 34 can be freely set. If flat portions are provided in a minimum cam lift portion and a maximum cam lift portion, no force in a direction to rotate the gear 33 is applied from the cam 34, and stable pressure state and non-pressure state can be maintained even if the application of electricity to the motor 31 is stopped. For the same reasons, the pressure state and non-pressure state can be detected even if the position of the gear 33 is not accurately detected.

(Modification of the Positioning Mechanism 180)

Figure 19:
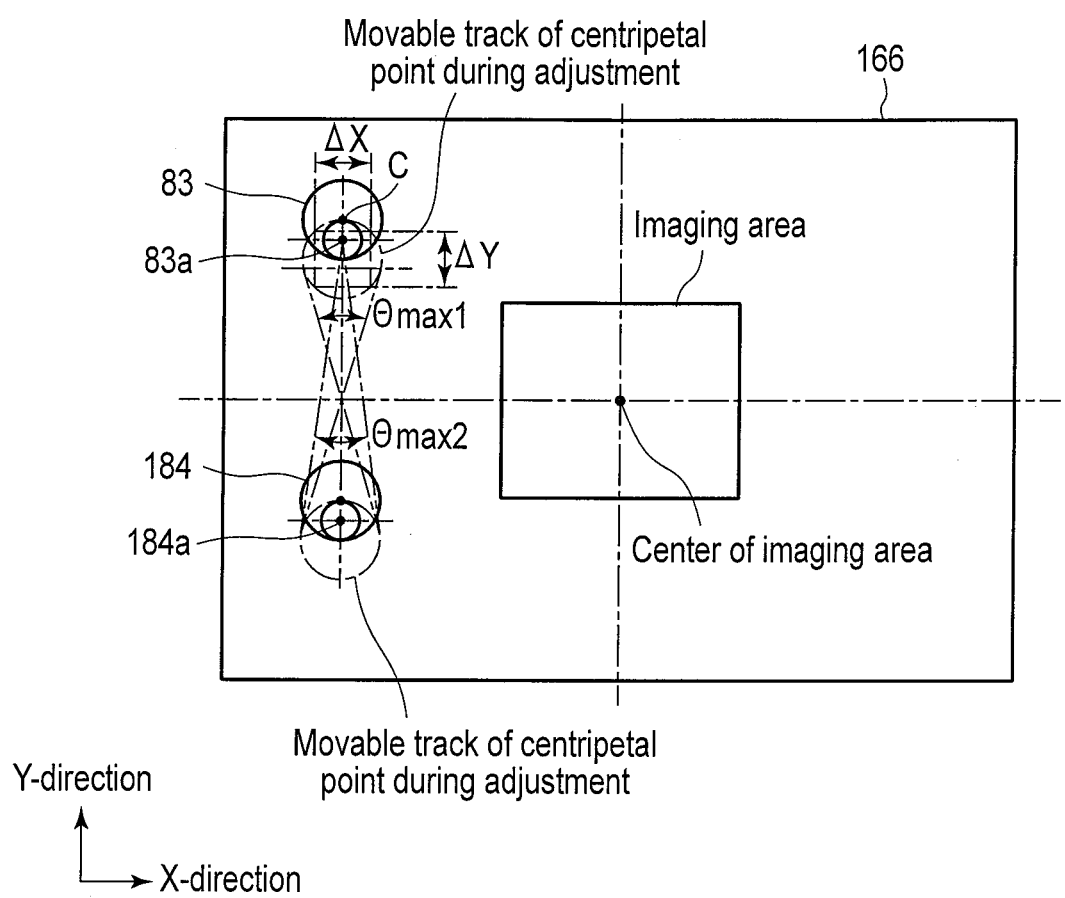
FIG. 19 is an operation explanatory diagram illustrating the operation of adjusting the position of the imaging portion by a positioning mechanism according to another modification of the embodiment.

FIG. 19 is an operation explanatory diagram illustrating a position adjustment mechanism by a positioning mechanism 80 according to a modification of the positioning mechanism 180 described above. The positioning mechanism 80 has a structure in which the shaft 183b of the first protrusion 183 is eccentric relative to the axis of the conical surface 183c of the press-contact portion 183a such that the shaft 183b is fixed to the press plate 188 after the adjustment of the rotational position of the shaft 183b. The positioning mechanism 80 is characterized in that a structure similar to that of the second protrusion 184 according to the embodiment described above is used.

According to the positioning mechanism 80, as shown in FIG. 19, by the adjustment of the rotational positions (eccentric states) of the first protrusion 183 and the second protrusion 184, the inclination angle θ of the holder 166 holding the imaging portion 117 can be adjusted, and the position of the holder 166 in the X-direction and the Y-direction can be adjusted in a predetermined amount. The central position of the imaging area which is shifted by angular adjustment can also be mechanically adjusted. In particular, an adjustment angular range θmax1 in this case can be larger than an adjustment angular range θmax2 according to the embodiment described above.

The first depression 185 with which to engage the first protrusion 183 comprising the eccentric press-contact portion 183a may have a conical surface 185a that comes into contact with the conical surface 183c of the press-contact portion 183a as in the embodiment described above. Alternatively, the first depression 185 may also be a wedge surface which is a slightly stretched conical surface, in the same manner as the second depression 186.

As described above, according to the camera system 10 in the present embodiment including the modification described above, the holder 166 holding the imaging portion 117 can be mechanically positioned and fixed at a desired position with accuracy by a simple and low-cost configuration, and photography can be performed with the VCM remaining turned off.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the engagement position where the first protrusion 183 is engaged with the first depression 185 and the engagement position where the second protrusion 184 is engaged with the second depression 186 are arranged in the Y-axis direction in the embodiment described above. However, this is not a limitation, and the two engagement positions may be set at any places along the XY plane as long as these engagement positions are located apart from each other.

A fixing mechanism according to another embodiment positions and fixes a movable body provided movably along a flat reference plane at a neutral position in a predetermined posture. The fixing mechanism includes a first movable engaging portion provided in the movable body, a second movable engaging portion provided in the movable body at a distance from the first movable engaging portion along the reference plane, a first fixed engaging portion which is engaged with the first movable engaging portion from a direction that intersects at right angles with the reference plane to keep the movable body at the neutral position and which allows the movable body to rotate around this engagement position along the reference plane, and a second fixed engaging portion which is engaged with the second movable engaging portion from the direction that intersects at right angles with the reference plane to inhibit the rotation of the movable body around the engagement position along the reference plane and thereby hold the movable body in the predetermined posture so that the movable body is positioned at the neutral position.

According to a positioning/fixing method in another embodiment, a movable body is moved along a flat reference plane and held at a neutral position by a drive mechanism, and a first fixed engaging portion is engaged with a first movable engaging portion provided in the movable body. In this way, the movable body is positioned along the reference plane. A second fixed engaging portion is engaged with a second movable engaging portion provided in the movable body at a distance from the first movable engaging portion along the reference plane. This inhibits the rotation of the movable body so that the movable body is fixed in the predetermined posture, and the application of electricity to the drive mechanism is stopped.

What is claimed is:

1. A holding mechanism comprising:
a fixed member;
a movable body which is provided with a first engaging portion and a second engaging portion formed at a distance from the first engaging portion and which is movable relative to the fixed member on a predetermined plane;
pressed means which comprises an extension extending from the fixed member to a part of the movable body, a third engaging portion and a fourth engaging portion provided at positions respectively facing the first engaging portion and the second engaging portion being disposed in the extension, the pressed means being movable to a first position where the third engaging portion and the fourth engaging portion engage with the first engaging portion and the second engaging portion and to a second position where the engagement is released; and
a press mechanism which is disposed in the fixed member and which presses the extension provided in the pressed means from a direction perpendicular to the predetermined plane to move the extension from the second position to the first position and thereby relatively hold the movable body at a predetermined position of the fixed member, the press mechanism evacuating the extension to a non-pressure position to allow the movement of the extension from the first position to the second position when the press mechanism releases the holding of the movable body at the predetermined position of the fixed member.

2. The holding mechanism according to claim 1, wherein the first engaging portion formed in the movable body is a depressed portion having a conical portion in section, the second engaging portion is a depressed portion which has a conical portion in section and which has an elliptic or oval opening, and the third engaging portion and the fourth engaging portion have protruding shapes to be engaged with the respective conical portions.

3. The holding mechanism according to claim 1, wherein the extension is a support member having a spring which is disposed in a cantilever state to be fixed at one end to the fixed member, and
when the pressure by the press mechanism is released, the engagement of the first engaging portion and the third engaging portion and the engagement of the second engaging portion and the fourth engaging portion are released by resilience resulting from spring performance of the support member.

4. The holding mechanism according to claim 1, wherein the press mechanism comprises an actuator which generates drive force for pressure, and a drive transmission mechanism which transmits the drive force, and
the drive transmission mechanism has a structure which keeps the extension pressed even when the application of electricity to the actuator is cut off while the support member is being pressed.

5. The holding mechanism according to claim 3, wherein the press mechanism comprises an actuator which generates drive force for pressure, and a drive transmission mechanism which transmits the drive force, and
the drive transmission mechanism has a structure which keeps the extension pressed even when the application of electricity to the actuator is cut off while the support member is being pressed.

6. The holding mechanism according to claim 4, wherein the drive transmission mechanism includes a first screw member which is held to rotate by drive force from the actuator, and a second screw member which moves in the direction perpendicular to the predetermined plane in response to the rotation of the first screw member and presses the extension.

7. The holding mechanism according to claim 3, wherein the drive transmission mechanism includes a first screw member which is held to rotate by drive force from the actuator, and a second screw member which moves in the direction perpendicular to the predetermined plane in response to the rotation of the first screw member and presses the extension.

8. The holding mechanism according to claim 1, further comprising
a drive mechanism which moves the movable body to the predetermined position relative to the fixed member,
wherein when the holding of the movable body is released, electricity is applied to the drive mechanism to vibrate the movable body, and vibrations are applied to the engagement of the first engaging portion and the third engaging portion or the engagement of the second engaging portion and the fourth engaging portion, and then the press mechanism is driven so that the extension is evacuated to the non-pressure position.

9. An imaging device comprising:
a detector which detects a shake;
a movable body which is provided with an image pickup device, a first engaging portion, and a second engaging portion formed at a distance from the first engaging portion and which is movable relative to a fixed member on a predetermined plane;
a drive mechanism which moves the movable body on the predetermined plane to correct the shake in accordance with shake information detected by the detector;
pressed means which comprises an extension extending from the fixed member to a part of the movable body, a third engaging portion and a fourth engaging portion provided at positions respectively facing the first engaging portion and the second engaging portion being disposed in the extension, the pressed means being movable to a first position where the third engaging portion and the fourth engaging portion engage with the first engaging portion and the second engaging portion and to a second position where the engagement is released; and
a press mechanism which is disposed in the fixed member and which presses the extension provided in the pressed means from a direction perpendicular to the predetermined plane to move the extension from the second position to the first position and thereby relatively hold the movable body at a predetermined position of the fixed member, the press mechanism evacuating the extension to a non-pressure position so that the extension is moved from the first position to the second position to allow the shake to be corrected by the drive mechanism when the press mechanism releases the holding of the movable body at the predetermined position of the fixed member.

10. The imaging device according to claim 9, wherein the first engaging portion formed in the movable body is a depressed portion having a conical portion in section, the second engaging portion is a depressed portion which has a conical portion in section and which has an elliptic or oval opening, and the third engaging portion and the fourth engaging portion have protruding shapes to be engaged with the respective conical portions.

11. The imaging device according to claim 9, wherein
the extension is a support member having a spring which is disposed in a cantilever state to be fixed at one end to the fixed member, and
when the pressure by the press mechanism is released, the engagement of the first engaging portion and the third engaging portion and the engagement of the second engaging portion and the fourth engaging portion are released by resilience resulting from spring performance of the support member.

12. The imaging device according to claim 9, wherein
the press mechanism comprises an actuator which generates drive force for pressure, and a drive transmission mechanism which transmits the drive force, and
the drive transmission mechanism has a structure which keeps the extension pressed even when the application of electricity to the actuator is cut off while the support member is being pressed.

13. The imaging device according to claim 11, wherein
the press mechanism comprises an actuator which generates drive force for pressure, and a drive transmission mechanism which transmits the drive force, and
the drive transmission mechanism has a structure which keeps the extension pressed even when the application of electricity to the actuator is cut off while the support member is being pressed.

14. The imaging device according to claim 12, wherein
the drive transmission mechanism includes a first screw member which is held to rotate by drive force from the actuator, and a second screw member which moves in the direction perpendicular to the predetermined plane in response to the rotation of the first screw member and presses the extension.

15. The imaging device according to claim 13, wherein
the drive transmission mechanism includes a first screw member which is held to rotate by drive force from the actuator, and a second screw member which moves in the direction perpendicular to the predetermined plane in response to the rotation of the first screw member and presses the extension.

16. The imaging device according to claim 9, wherein
when the holding of the movable body is released, electricity is applied to the drive mechanism to vibrate the movable body, and vibrations are applied to the engagement of the first engaging portion and the third engaging portion or the engagement of the second engaging portion and the fourth engaging portion, and then the press mechanism is driven so that the extension is evacuated to the non-pressure position.

17. The imaging device according to claim 9, further comprising
neutral holding detection means for detecting whether the movable body is held at a neutral position preset in the fixed member;
drive mechanism control means for controlling the drive mechanism to drive the movable body to the neutral position when the movable body is not held at the neutral position; and
judgment means for judging whether the movable body is held at a position within an allowable neutral range.

* * * * *